(12) United States Patent
Fuchie

(10) Patent No.: US 9,596,462 B2
(45) Date of Patent: Mar. 14, 2017

(54) IMAGE PROCESSING APPARATUS, METHOD, AND MEDIUM WITH FEEDBACK CONTROL AND QUANTIZATION SEARCH

(71) Applicant: Sony Corporation, Tokyo (JP)

(72) Inventor: Takaaki Fuchie, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 573 days.

(21) Appl. No.: 13/869,067

(22) Filed: Apr. 24, 2013

(65) Prior Publication Data

US 2013/0322528 A1    Dec. 5, 2013

(30) Foreign Application Priority Data

May 30, 2012  (JP) ................................. 2012-123593

(51) Int. Cl.

| | |
|---|---|
| H04N 7/26 | (2006.01) |
| G06K 9/36 | (2006.01) |
| H04N 7/50 | (2006.01) |
| H04N 7/30 | (2006.01) |
| H04N 19/124 | (2014.01) |
| H04N 19/172 | (2014.01) |
| H04N 19/149 | (2014.01) |

(52) U.S. Cl.
CPC ....... *H04N 19/0009* (2013.01); *H04N 19/124* (2014.11); *H04N 19/149* (2014.11); *H04N 19/172* (2014.11)

(58) Field of Classification Search
CPC combination set(s) only.
See application file for complete search history.

(56) References Cited

U.S. PATENT DOCUMENTS

| | | | |
|---|---|---|---|
| 2006/0133674 A1* | 6/2006 | Shibata | H04N 7/15 382/232 |
| 2011/0176606 A1* | 7/2011 | Fuchie | H04N 19/176 375/240.05 |
| 2011/0188769 A1 | 8/2011 | Fuchie et al. | |
| 2012/0057784 A1* | 3/2012 | Horiuchi | H04N 19/176 382/166 |

FOREIGN PATENT DOCUMENTS

| | | |
|---|---|---|
| WO | WO-2009/157577 A1 | 12/2009 |
| WO | WO-2009/157579 A1 | 12/2009 |

* cited by examiner

*Primary Examiner* — Dave Czekaj
*Assistant Examiner* — Alison Slater
(74) *Attorney, Agent, or Firm* — Chip Law Group

(57) ABSTRACT

An image processing apparatus includes: a quantization parameter determination section which determines a reference quantization parameter; a back search section which detects a detected quantization parameter for each coding unit; a coding section which codes the input image for each coding unit; a feedback control section which confirms the generated code quantity of the input image, and if it is predicted that the generated code quantity for each image unit exceeds the target code quantity for each image unit, increases the determined reference quantization parameter; and a coding control section which performs control such that, during dubbing, the coding section uses the reference quantization parameter when the back search detection is not successful and selectively uses the reference quantization parameter or the detected quantization parameter in accordance with a determination result of a need for code quantity suppression when the back search detection is successful.

6 Claims, 12 Drawing Sheets

ND MEDIUM WITH FEEDBACK
IMAGE PROCESSING APPARATUS, METHOD, AND MEDIUM WITH FEEDBACK CONTROL AND QUANTIZATION SEARCH

FIELD

The present technology relates to an image processing apparatus, an image processing method, and a program, and in particular, to an image processing apparatus which realizes improvement of fixed-length coding and dubbing image quality, or the like.

BACKGROUND

In image coding for production, there is a strong demand for all-intra picture code quantity-fixed encoding focusing on editability, and control (quantization value control) for strictly suppressing the code quantity to be equal to or smaller than a given amount, that is, the picture fixed-length coding is necessary. For example, a system or the like which performs recording in a video tape recorder (VTR) is exemplified from long ago. In a file-based system which records an image in a hard disk, a flash memory, or the like, there is a strong demand for picture fixed-length coding from the viewpoint of each of random access to each picture.

Simultaneously, there is a demand for suppressing image quality deterioration due to the repetition of encoding and decoding in an edition process. In the picture fixed-length coding, as a method of maintaining dubbing image quality, in the related art, precoding is performed multiple times by binary search or the like, an optimum quantization value satisfying the conditions is found, a quantization parameter during previous encoding in back search is estimated from among quantization values greater than the optimum quantization value, and the quantization parameter is introduced or the code quantity is confirmed by precoding again after back search, thereby suppressing the code quantity to be equal to or smaller than a given value (see Japanese Patent No. 3561962).

However, since multiple times of precoding result in an increase in the processing amount, it is desirable to reduce the number of times of precoding from the viewpoint of the processing amount (circuit scale)/power consumption/price. In a coding scheme, such as advanced video coding (AVC) which performs compression using an intra-screen correlation, when realized by hardware, such as large scale integration (LSI), parallelization or pipeline processing cannot be performed in a macro block (MB) unit, and it is difficult to perform binary search of the related art.

Accordingly, as described in Pamphlet of International Publication WO 2009/157577 and Pamphlet of International Publication WO 2009/157579, the applicant has suggested that code quantity control by simple code quantity estimation for AVC and a dubbing image quality maintenance technology.

SUMMARY

In the technologies described in Pamphlet of International Publication WO 2009/157577 and Pamphlet of International Publication WO 2009/157579, it is determined whether or not to introduce a quantization parameter estimation result during previous encoding by back search in a picture unit. For this reason, when a picture satisfying the introduction condition and a picture not satisfying the introduction condition alternately appear, flickering may occur.

It is therefore desirable to satisfactorily realize improvement of fixed-length coding and dubbing image quality.

A concept of an embodiment of the present technology resides in an image processing apparatus including a quantization parameter determination section which determines a reference quantization parameter to be predicted if a generated code quantity for each image unit when coding an input image becomes close to a target code quantity for each image unit, a back search section which detects, as a detected quantization parameter for each coding unit, a quantization parameter used when the input image is coded previously, a coding section which codes the input image for each coding unit, a feedback control section which confirms the generated code quantity of the input image coded by the coding section for each feedback control unit, and if it is predicted that the generated code quantity for each image unit exceeds the target code quantity for each image unit, increases the determined reference quantization parameter, and a coding control section which performs control such that, during dubbing, the coding section uses the reference quantization parameter subjected to the feedback control for each coding unit when the back search detection is not successful and selectively uses the reference quantization parameter subjected to the feedback control or the detected quantization parameter obtained by the back search detection for each coding unit in accordance with a determination result of a need for code quantity suppression when the back search detection is successful.

In the embodiment of the present technology, the reference quantization parameter which is predicted that the generated code quantity for each image unit when coding the input image becomes close to the target code quantity for each image unit is determined by the quantization parameter determination section. The quantization parameter used when the input image is coded previously is detected by the back search section as the detected quantization parameter for each coding unit. The input image is coded for each coding unit by the coding section.

The generated code quantity of the input image coded by the coding section is confirmed by the feedback control section for each feedback control unit, and when it is predicted that the generated code quantity for each image unit exceeds the target code quantity for each image unit, control is performed such that the determined reference quantization parameter increases.

During dubbing, for each coding unit, control is performed on the coding section by the coding control section as follows. That is, when the back search detection is not successful, control is performed such that the coding section uses the reference quantization parameter subjected to the feedback control. When the back search detection is successful, control is performed such that the coding section selectively uses the reference quantization parameter subjected to the feedback control or the detected quantization parameter obtained by the back search detection in accordance with the determination result of the need for the code quantity suppression.

For example, the embodiment of the present technology may be configured such that, when the back search detection is successful, the coding control section performs control such that, if it is determined that there is no need for the code quantity suppression, the coding section uses the detected quantization parameter, and if it is determined there is a need for the code quantity suppression, the coding section uses the detected quantization parameter when the detected quantization parameter is not smaller than the reference quantization parameter subjected to the feedback control and uses the reference quantization parameter subjected to the feedback control when the detected quantization parameter is smaller than the reference quantization parameter subjected to the feedback control.

In this case, the embodiment of the present technology may be configured such that, for example, when an integrated value of the generated code quantity to a last feedback control unit is greater than an integrated value of the target code quantity to a last feedback control unit, the coding control section determines that there is a need for the code quantity suppression.

In this way, in the embodiment of the present technology, since the introduction of the detected quantization parameter obtained by the back search detection is determined in a coding unit, it is possible to avoid the occurrence of flickering when the determination is made in a picture unit. In the embodiment of the present technology, if there is a need for code quantity suppression, since the detected quantization parameter obtained by the back search detection is used in a usable range, it is possible to decrease the addition of unwanted distortion compared to a case where the reference quantization parameter subjected to the feedback control is simply used, thereby reducing image quality deterioration.

According to the embodiment of the present technology, it is possible to realize improvement of fixed-length coding and dubbing image quality.

DETAILED DESCRIPTION

Figure 1:
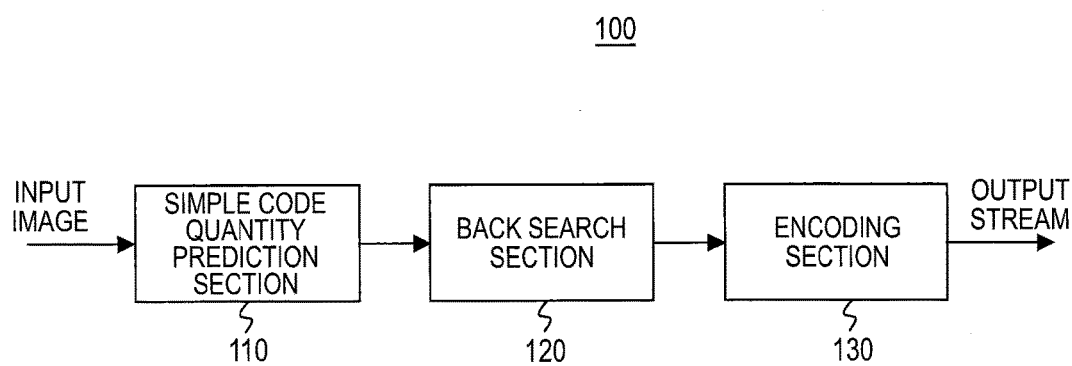
FIG. 1 is a block diagram showing the basic functional configuration of an image processing apparatus as an embodiment.

Hereinafter, forms for carrying out the present technology (hereinafter, referred to as "embodiment") will be described. The description will be provided in the following order.
1. Embodiment
2. Modifications 1. Embodiment 1-1. Configuration of Image Processing Apparatus FIG. 1 is a block diagram showing the basic functional configuration of an image processing apparatus 100 as an embodiment. The image processing apparatus 100 has a simple code quantity prediction section 110, a back search section 120, and an encoding section 130.

The simple code quantity prediction section 110 estimates a rough quantization parameter from an input image by simple precoding (code quantity estimation). The back search section 120 performs back search with the quantization parameter estimated by the simple code quantity prediction section 110 as a starting point to estimate a quantization parameter during previous encoding. The encoding section 130 determines a quantization parameter for use in actual encoding on the basis of the quantization parameter estimated by the simple code quantity prediction section 110 and the quantization parameter obtained by the back search section 120, and performs encoding (coding) to obtain an output stream.

Figure 2:
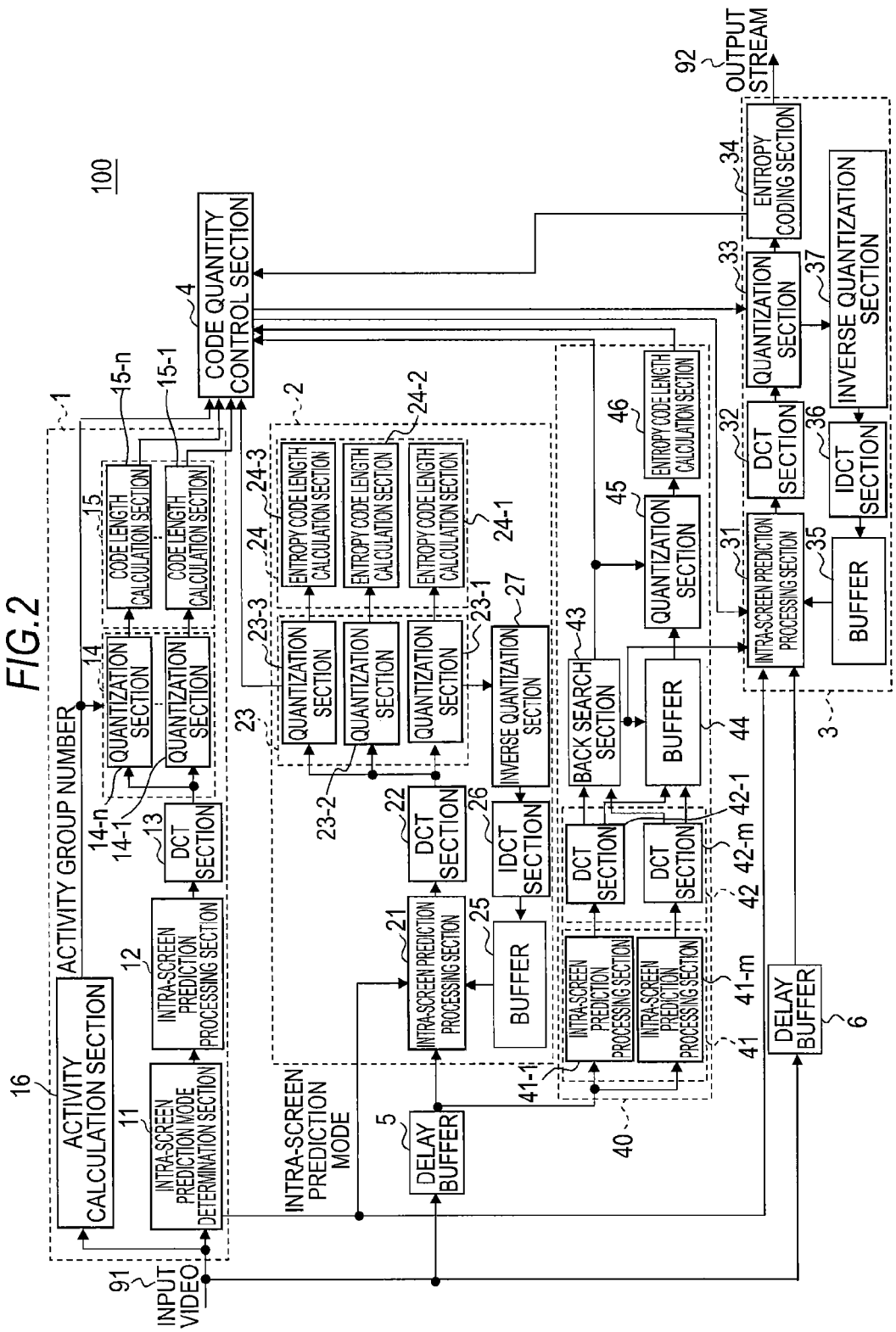
FIG. 2 is a diagram showing a specific configuration example of an image processing apparatus.

FIG. 2 shows a specific configuration example of the image processing apparatus 100. The image processing apparatus 100 performs code quantity control by an image compression scheme using arithmetic coding represented by H.264/AVC (Advanced Video Coding; Advanced Motion Image Compression Coding Standard) or the like. At this time, in order to realize a satisfactory code quantity distribution in a picture and to improve dubbing characteristics, pre-encoding by a second pre-encoding section and a previous mode estimation pre-encoding section 40 is performed in parallel using the parameters obtained by a first pre-encoding section 1, and it is determined whether encoding in a dubbing mode or encoding in a raw picture mode is performed. In a main encoding section 3, parameter for use in encoding are switched depending on the raw picture mode or the dubbing mode, and main encoding is performed.

The image processing apparatus 100 performs only quantization and code length calculation in parallel by the first pre-encoding section 1 and the second pre-encoding section 2 and shares other processing elements, thereby achieving reduction in circuit scale by circuit commonalization. That is, intrinsically, when parallel pre-encoding is performed, it is necessary to provide all processing elements in parallel. In the image processing apparatus 100, processing elements which can be commonalized without affecting precision are accurately specified and commonalized, thereby suppressing an increase in circuit scale and delay time (Latency).

In the first pre-encoding section 1, parallel pre-encoding with slightly decreased precision and suppressed circuit scale and processing load is performed with a wide range of quantization parameters (QP), and QP which realizes a target code quantity is roughly estimated. In the second pre-encoding section 2, parallel pre-encoding with increased precision is performed in a narrow range, and a reference quantization parameter QPMB which is used in the main encoding section 3 is determined. With the above, the image processing apparatus 100 increases precision of image coding and reduces processing load. Since an error due to simplification of pre-encoding has a correlation with a bit rate or the quantization parameter QP, a statistical model whose details will be described below is created in advance, and correction of an error from the bit rate or the quantization parameter QP is performed.

The image processing apparatus 100 has the first pre-encoding section 1, the second pre-encoding section 2, the main encoding section 3, a code quantity control section 4, delay buffer 5 and 6, and the previous mode estimation pre-encoding section 40.

The first pre-encoding section 1 is a module which performs first pre-encoding, and includes an intra-screen prediction mode determination section 11, an intra-screen prediction processing section 12, a discrete cosine transform (DCT) section 13, a quantization section 14, an entropy code length calculation section 15, and an activity calculation section 16. The second pre-encoding section 2 is a module which performs second pre-encoding, and includes an intra-screen prediction processing section 21, a DCT section 22, a quantization section 23, an entropy code length calculation section 24, a buffer 25, an inverse DCT (IDCT) section 26, and an inverse quantization section 27.

The previous mode estimation pre-encoding section 40 is a module which performs back search, and includes an intra-screen prediction processing section 41, a DCT section 42, a back search section 43, a buffer 44, a quantization section 45, and an entropy code length calculation section 46. The main encoding section 3 is a module which performs main encoding, and includes an intra-screen prediction processing section 31, a DCT section 32, a quantization section 33, an entropy coding section 34, a buffer 35, an IDCT section 36, and an inverse quantization section 37. The code quantity control section 4 is a module which performs code quantity control.

1-2. Prediction of Quantization Parameter and Quantization Matrix

[1-2-1. Calculation of Low-Precision Generated Code Quantity]

For example, the image processing apparatus 100 applicatively selects and uses three quantization matrixes Q Matrix in accordance with the degree of coding difficulty (details will be later). The image processing apparatus 100 sets the quantization matrix Q Matrix, and the generated code quantity is roughly estimated by simple processing using the first pre-encoding section 1 on the quantization parameters QP in a possible range of the quantization matrix Q Matrix. Hereinafter, the generated code quantity estimated by the pre-encoding section 1 is called a low-precision generated code quantity.

The image processing apparatus 100 executes the same processing all quantization matrixes Q Matrix, and calculates a low-precision generated code quantity when the quantization matrix Q Matrix and the quantization parameter QP are changed. The image processing apparatus 100 uses the quantization parameter QP and the quantization matrix Q Matrix when the low-precision generated code quantity becomes closest to a target code quantity in the second pre-encoding section 2 as the next step. In this case, it is assumed that the quantization parameter QP is a predictive quantization parameter QPd which is used as an average quantization parameter BaseQP of a picture in the second pre-encoding section 2, and the quantization matrix Q Matrix is a quantization matrix Q Matrix (hereinafter, referred to as "predictive quantization matrix Q MatrixD") of a picture which is used in the second pre-encoding section 2.

At this time, the image processing apparatus 100 calculates a low-precision generated code quantity in an input image 91 using some quantization parameters QP (hereinafter, referred to as "selected quantization parameter QP1") selected discretely. The image processing apparatus 100 calculates the low-precision generated code quantity between the selected quantization parameters QP1 by interpolation, and calculates the low-precision generated code quantity for all quantization parameters QP in a possible range of the quantization matrix Q Matrix.

Actually, the input image 91 is initially input to the intra-screen prediction mode determination section 11 of the first pre-encoding section 1. The intra-screen prediction mode determination section 11 generates a differential image data by an intra-screen prediction mode on the basis of the input image 91, and determines the intra-screen prediction mode on the basis of the prediction of the generated code quantity of the differential image data. The prediction mode (prediction direction) is determined from nine prediction modes in a unit of minimum 4×4 pixels.

The determined intra-screen prediction mode is sent to the intra-screen prediction processing section 12, and is also sent to the second pre-encoding section 2 or the main encoding section 3. The intra-screen prediction mode is used in second pre-encoding by the second pre-encoding section 2 or main encoding by the main encoding section 3.

The intra-screen prediction processing section 12 calculates a differential image between a predicted image and the input image 91, and generates differential image data. The predicted image herein is produced from the input image 91 for reducing processing. In this way, the first pre-encoding section 1 performs intra-screen prediction processing using the input image, whereby it is possible to reduce an inverse quantization section, an IDCT section, and a buffer, making it possible to reduce circuit scale.

The DCT section 13 executes integer-precision DCT processing on differential image data, and if a DCT coefficient is generated, sends the DCT coefficient to the quantization section 14. The quantization section 14 performs quantization on the DCT coefficient, and if a quantized coefficient is generated, sends the quantized coefficient to the entropy code length calculation section 15. The entropy code length calculation section 15 performs a context-adaptive variable-length coding scheme (CAVLC) on the quantized coefficient to calculate a code quantity. According to CAVLC, a high-efficiency coding scheme can be adaptively selected in accordance with circumstances.

In this way, the first pre-encoding has a feature in that, even when CABAC (Context-Adaptive Binary Arithmetic Coding) is used as an entropy coding scheme in main encoding, CAVLC is used for code quantity calculation. CABAC is a context-adaptive binary arithmetic coding scheme.

The quantization section 14 has quantization sections 14-1, . . . , and 14-$n$ (n=1, 2, 3 . . . ) provided in parallel, and the entropy code length calculation section 15 has entropy code length calculation sections 15-1, . . . , and 15-$n$ (n=1, 2, 3 . . . ) provided in parallel. The value of n is set to, for example, 15. The quantization section 14 sets the selected quantization parameters QP1 corresponding to the quantization matrix Q Matrix from among the quantization parameters QP having 0 to 51 in the respective quantization sections 14-1, . . . , and 14-$n$.

The selected quantization parameters QP1 are discretely selected at an arbitrary interval from a possible range of the quantization parameter QP of the quantization matrix Q Matrix. For example, the selected quantization parameters QP1 may be selected at a given interval or may be selected at an interval which changes in accordance with the value of the quantization parameter QP. With this configuration, the first pre-encoding section 1 executes quantization and code length calculation in parallel on a plurality of quantization parameters QP corresponding to the parallel number and outputs the respective generated code quantities to the code quantity control section 4.

That is, the first pre-encoding section 1 performs the first pre-encoding with a wide range of quantization parameters QP by parallel pre-encoding with suppressed circuit scale using the quantization section 14 and the entropy code length calculation section 15, thereby calculating the generated code quantities for a wide range of quantization parameters QP.

The activity calculation section 16 calculates activity simultaneously and in parallel with the determination of the intra-screen prediction mode by the intra-screen prediction mode determination section 11, and divides a macro block (MB) into groups by the activity. That is, if it is assumed that a macro block is divided into groups of NumOfActivity-Group, the activity calculation section 16 compares ActivityThreshold[0] to ActivityThreshold[NumOfActivity-Group-2] with the value of the activity to determine an activity group.

The quantization parameter QP which is actually used in quantization processing is obtained by adding an offset (AdaptQPDelta) depending on an activity group to an average quantization parameter QP (BaseQP) of a picture as expressed in Expression (1).

$$MB\_QP=BaseQP+AdaptQPDelta[Activity\_group] \quad (1)$$

For example, if NumOfActivityGroup is 13, the respective values of AdaptQPDelta can be ADAPTQPDELTA[13]={−6, −5, −4, −3, −2, −1, 0, 1, 2, 3, 4, 5, 6}. An activity group number determined for each MB is input to the quantization section 14. The quantization section 14 adds an offset according to an activity group to the selected quantization parameter QP1 to calculate an adaptive quantization parameter QPt. The quantization section 14 executes quantization processing to a DCT coefficient on the basis of the adaptive quantization parameter QPt.

The first pre-encoding section 1 sets the next quantization matrix Q Matrix and the selected quantization parameters QP1 corresponding to the quantization matrix Q Matrix, thereby calculating the generated code quantities in the same manner. As a result, the first pre-encoding section 1 calculates the generated code quantities for the quantization matrix Q Matrix and the selected quantization parameters QP1 corresponding to the quantization matrix Q Matrix.

[1-2-2. Correction of Error in Generated Code Quantity]

The code quantity control section 4 performs correction on the generated code quantity calculated in the first pre-encoding section 1. The correction herein is performed using the fact that an error has a certain level of tendency. A first error factor is the use of the input image 91 in intra-screen prediction processing instead of a local decode picture.

In this case, since distortion by a codec does not remain on a picture which is used in intra-screen prediction, there is a tendency that coding efficiency is improved compared to actual encoding, and the code quantity seems to be small. Since the magnitude of an error depends on the magnitude of distortion, from the relationship between the generated code quantity and the error, there is a tendency that, if the bit rate decreases, the error increases. From the relationship between the quantization parameter QP and the error, there is a tendency that, if the quantization parameter QP increases, the error increases. Accordingly, statistical data of the magnitude of the error is taken in advance and defined as a function of the bit rate "r" and QP "q".

Specifically, the code quantity control section 4 creates a model of an average error by the bit rate and a model of an average error by the quantization parameter QP for the generated code quantity when coding by CAVLC. This error model is stored as an expression or a table corresponding to the quantization parameter QP and the bit rate in advance.

The code quantity control section 4 calculates correction amounts C_rate and C_qp, which represent errors to be corrected from the quantization parameter QP and the bit rate, from the corresponding error model. The code quantity control section 4 selects a small value from among the correction amounts C_rate and C_qp corresponding to the quantization parameter QP and the bit rate as a correction amount Cv in accordance with Expression (2).

$$\text{correction amount } Cv = \min(C\_rate, C\_qp) \quad (2)$$

Accordingly, it is possible to prevent the corrected generated code quantity from being greater a high-precision generated code quantity to be calculated in the second pre-encoding section 2 because the correction amount of the error becomes excessively large. The correction amounts C_rate and C_qp represent the ratio (%) of a correction amount to the generated code quantity (Pre-Encode code quantity) calculated by the first pre-encoding section 1.

The code quantity control section 4 multiples the correction amount Cv to the generated code quantity calculated by the first pre-encoding section 1 in accordance with Expression (3), thereby calculating a correction amount (hereinafter, referred to as "CAVLC corrected code quantity") for the generated code quantity. The code quantity control section 4 adds the CAVLC corrected code quantity to the generated code quantity, thereby calculating a low-precision generated code quantity for CAVLC.

$$CAVLC \text{ corrected code quantity} = \text{Pre-Encode code quantity} \times Cv \quad (3)$$

A second error factor occurs only when CABAC is selected as an entropy coding scheme. In the first pre-encoding section 1, coding by CABAC is not executed, and a low-precision generated code quantity when coding by CABAC is predicted from the code quantity of CAVLC. Since CABAC has better coding efficiency than CAVLC, there is a tendency that the generated code quantity pre-encoded by CAVLC seems to be larger than the actual code quantity.

For example, from the relationship between the generated code quantity and the error, there is a tendency that, if the bit rate (Bitrate) decreases, the efficiency of CABAC is improved, thus the magnitude of the error statistically increases. Similarly, correction is made by taking statistical data of the magnitude of the error in advance and creating a mode of an average error.

It will be apparent that an error caused by CABAC changes to an opposite side with respect to the quantization parameter QP and the bit rate, and the change amount is small compared to an error which occurs in coding by the code quantity of CAVLC. Accordingly, the correction amount (hereinafter, referred to as "CABAC correction amount") for CABAC is defined as a function of the bit rate "r" and QP "q". At this time, a correction amount Cb is calculated by Expression (4).

$$\text{correction amount } Cb = \min(r, q) \quad (4)$$

The code quantity control section 4 multiples the correction amount Cv to the generated code quantity (Pre-Encode code quantity) calculated by the first pre-encoding section 1 in accordance with Expression (5), thereby calculating a correction amount (hereinafter, referred to as "CABAC corrected code quantity") for the generated code quantity.

$$CABAC \text{ corrected code quantity} = \text{Pre-Encode code quantity} \times Cb \quad (5)$$

Figure 3:
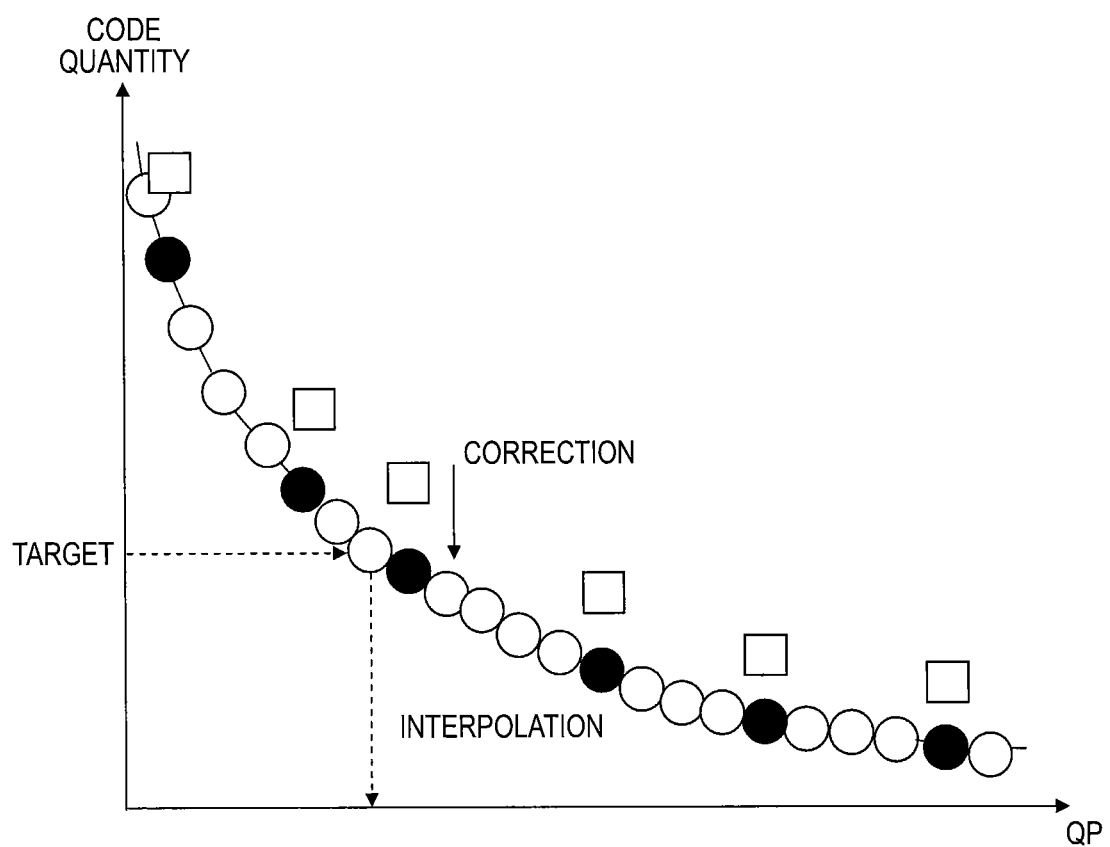
FIG. 3 is a diagram illustrating calculation of a code quantity by correction of QPs having discrete values and interpolation between QPs.

The code quantity control section 4 adds the CABAC corrected code quantity to a low-precision generated code quantity, thereby calculating a low-precision generated code quantity for CABAC. As shown in FIG. 3, the code quantity control section 4 can calculate the CAVLC correction amount and the CABAC corrected code quantity (represented by black circles) corrected with respect to the generated code quantity (represented by rectangles) calculated by the first pre-encoding section 1.

Next, the code quantity control section 4 performs estimation processing of a quantization parameter (QP). As described above, the first pre-encoding section 1 performs pre-encoding with the selected quantization parameters QP1 having discrete values at an arbitrary interval to acquire the generated code quantity. The code quantity control section 4 calculates the generated code quantity (represented by white circles) for the quantization parameters QP other than the selected quantization parameters QP1 in a possible range of the quantization parameters QP of the quantization matrix Q Matrix.

As the interpolation processing, general interpolation processing, such as linear interpolation, may be used. That is, as shown in FIG. 3, correction is performed on the quantization parameters QP (represented by rectangles) having discrete values obtained by the first pre-encoding section 1 to obtain the quantization parameters QP (represented by black circles) after correction, and interpolation is made for the quantization parameters QP (represented by white circles) therebetween to calculate the code quantity.

In this way, the code quantity control section 4 corrects an error in the generated code quantity caused by simplified processing in the first pre-encoding section 1 with respect to the generated code quantity calculated by the first pre-encoding section 1 to calculate a low-precision generated code quantity for CAVLC. Accordingly, the code quantity control section 4 can improve prediction precision of the generated code quantity by simplified coding processing.

The code quantity control section 4 calculates a low-precision generated code quantity as a predicted amount of the generated code quantity by CABAC using the low-precision generated code quantity for CAVLC. Accordingly, the code quantity control section 4 can estimate the low-precision generated code quantity by CABAC without performing CABAC having complicated processing.

The code quantity control section 4 predicts the low-precision generated code quantity for the quantization parameters QP other than the selected quantization parameters QP1 from the low-precision generated code quantity predicted by the selected quantization parameters QP1 discretely selected by interpolation processing. Accordingly, the code quantity control section 4 performs coding of the input image 91 without unnecessarily using all quantization parameters QP, thereby simplifying the configuration of the first pre-encoding section 1.

[1-2-3. Determination of Predictive Quantization Matrix]

As described above, for all possible quantization parameters QP of the quantization matrix Q Matrix, the low-precision generated code quantity is calculated. The code quantity control section 4 changes the quantization matrix Q Matrix in accordance with the degree of coding difficulty and selects the quantization parameter QP closest to the target code quantity as a reference quantization parameter QPMB on the basis of the low-precision generated code quantity corresponding to the changed quantization matrix Q Matrix.

The code quantity control section 4 selects, as a near quantization parameter QPn, a quantization parameter QP used when a low-precision generated code quantity closest to a target code quantity is generated for each quantization matrix Q Matrix. For example, the code quantity control section 4 uses the near quantization parameter QPn selected for each quantization matrix Q Matrix as the degree of coding difficulty. Of course, a different index, such as activity, may be used.

Here, it is assumed that the number of quantization matrixes Q Matrix to be switched and used is NumOfQ MatrixId, Id (identifier) is in an ascending order from the quantization matrix Q Matrix having gentle inclination, and the maximum quantization parameter QP in the possible range of the quantization matrix Q Matrix is Q MatrixThreshold[Id].

The code quantity control section 4 compares the near quantization parameter QPn with QMatrixThreshold from the quantization matrix Q Matrix having a small value of ID. The code quantity control section 4 determines the quantization matrix Q Matrix having the minimum ID from among the quantization matrixes Q Matrix with the near quantization parameter QPn smaller than Q MatrixThreshold[Id] as a predictive quantization matrix Q MatrixD. The code quantity control section 4 determines the near quantization parameter QPn in the predictive quantization matrix Q MatrixD as the predictive quantization parameter QPd.

That is, the code quantity control section 4 determines, as the predictive quantization matrix Q MatrixD, the quantization matrix Q Matrix having minimum inclination from among the quantization matrixes Q Matrix which can take the quantization parameters QP with the low-precision generated code quantity close to the target code quantity. The predictive quantization matrix Q MatrixD is also used in the main encoding by the main encoding section 3. The code quantity control section 4 can use the quantization matrix Q Matrix having minimum inclination from among the quantization matrixes Q Matrix which satisfy the conditions of the low-precision generated code quantity, whereby deterioration in image quality can be prevented as much as possible.

The code quantity control section 4 calculates the low-precision generated code quantity for the selected quantization parameters QP1 in a possible range of the quantization matrix Q Matrix in order from the quantization matrix Q Matrix having small ID by the first pre-encoding section 1. When the quantization matrix Q Matrix with the near quantization parameter QPn smaller than Q MatrixThreshold [Id] is detected, the code quantity control section 4 determines the quantization matrix Q Matrix and the near quantization parameter QPn as the predictive quantization matrix Q MatrixD and the predictive quantization parameter QPd.

At this time, the code quantity control section 4 allows the first pre-encoding section 1 to start processing on the next picture. That is, the code quantity control section 4 does not allow the first pre-encoding section 1 to calculate the low-precision generated code quantity for the quantization matrix Q Matrix of the next ID relating to the picture being processed. Accordingly, the code quantity control section 4 can reduce a processing time necessary for determining the predictive quantization parameter QPd and the predictive quantization matrix Q MatrixD.

In this way, the code quantity control section 4 selects, as the predictive quantization matrix Q MatrixD, the quantization matrix Q Matrix having minimum inclination so as to prevent deterioration in image quality from among the quantization matrixes Q Matrix which can take quantization parameter QP with the low-precision generated code quantity close to the target code quantity.

The code quantity control section 4 selects, as the predictive quantization parameter QPd, the quantization parameter QP with the low-precision generated code quantity closest to the target code quantity in the predictive quantization matrix Q MatrixD. Accordingly, the code quantity control section 4 can select, as the predictive quantization parameter QPd, the quantization parameter QP with the low-precision generated code quantity closest to the target code quantity while adaptively changing the quantization matrix Q Matrix so as to prevent degradation in image quality as less as possible.

1-3. Determination of Reference Quantization Parameter

The second pre-encoding section 2 actually executes the same coding as the encoder 3 using the predictive quantization parameter QPd and the predictive quantization matrix Q MatrixD, thereby calculating a high-precision generated code quantity with high precision. Hereinafter, the generated code quantity calculated by the second pre-encoding section 2 is called a high-precision generated code quantity. At this time, the second pre-encoding section 2 calculates the high-precision generated code quantity using the quantization parameters QP before and after the predictive quantization parameter QPd instead of the predictive quantization parameter QPd, and predicts the high-precision generated code quantity near the predictive quantization parameter QPd using the variation.

The code quantity control section 4 supplies the predictive quantization parameter QPd, the predictive quantization matrix Q MatrixD, and the activity group of each MB to the second pre-encoding section 2. The second pre-encoding section 2 performs the second pre-encoding on the basis of these values. In the second pre-encoding section 2, the input image 91 is input to the intra-screen prediction processing section 21 after being delayed through the delay buffer 5.

The intra-screen prediction processing section 21 calculates the difference between the predicted image and the input image 91, and generates differential image data. The DCT section 22 executes DCT processing on differential image data and generates a DCT coefficient. The quantization section 23 executes quantization processing on the DCT coefficient and generates a quantized coefficient. The entropy code length calculation section 24 performs entropy coding on the quantized coefficient using CAVLC or CABAC and calculates the high-precision generated code quantity.

During the processing in the second pre-encoding section 2, the quantization section 23 sends the quantized coefficient to the inverse quantization section 27. The inverse quantization section 27 inversely quantizes the quantized coefficient and reproduces the DCT coefficient. The IDCT section 26 performs IDCT on the DCT coefficient, generates a local decode image, and stores the local decode image in the buffer 25.

In this example, the quantization section 23 has three-stage quantization sections 23-1, 23-2, and 23-3, and the entropy code length calculation section 24 has three-stage entropy code length calculation sections 24-1, 24-2, and 24-3. The reason for a small number of stages of the three stages is that the quantization parameter QP is already roughly estimated in a wide range by the first pre-encoding.

With this configuration, the quantization section 23 and the entropy code length calculation section 24 execute processing in parallel, and the high-precision generated code quantity with the predictive quantization parameter QPd and the quantization parameters QP before and after the predictive quantization parameter QPd is obtained. At this time, the entropy code length calculation section 24 selects the same scheme as an entropy coding scheme of the main encoding by the main encoding section 3 from CABAC/CAVLC.

Subsequently, the code quantity control section 4 determines the reference quantization parameter QPMB of the picture for use in the main encoding from the high-precision generated code quantity obtained by the second pre-encoding. The code quantity control section 4 sends quantization information (Q Matrix, QP of each MB, and the like) from the determined reference quantization parameter QPMB of the picture, the predictive quantization matrix QMatrixD, or the activity group of each MB to the main encoding section 3.

In this case, when the target code quantity is trapped in the high-precision generated code quantity obtained by the second pre-encoding, that is, is expressed by Expression (6), the quantization parameter QP closest to the target code quantity is selected as the reference quantization parameter QPMB.

$$\text{Generated\_bits}(QP\_precode\ 1+1) \leq \text{Target\_bits} \leq \text{Generated\_bits}(QP\_precode\ 1-1) \quad (6)$$

Otherwise, the code quantity control section 4 obtains the variation of the high-precision generated code quantity with respect to the change of the quantization parameter QP from the result of the second pre-encoding. The predictive quantization parameter QPd is calculated on the basis of the low-precision generated code quantity by the first pre-encoding section 1. For this reason, the quantization parameter QP closest to the target code quantity is near the predictive quantization parameter QPd. When the value of the quantization parameter QP is close, the variation of the generated code quantity is substantially uniform.

Accordingly, the code quantity control section 4 predicts the high-precision generated code quantity with each quantization parameter QP from the variation of the high-precision generated code quantity in the predictive quantization parameter QPd and the quantization parameters QP before and after the predictive quantization parameter QPd, and selects the quantization parameter QP closest to the target code quantity as the reference quantization parameter QPMB.

First, when the quantization parameter QP is decremented by "1", DiffRatio_1 which represents how percent the high-precision generated code quantity changes is obtained from the result of the second pre-encoding as shown in Expression (7). Generated_bits represents the generated code quantity in the second pre-encoding, QP_precode1 represents the predictive quantization parameter QPd, and QP_precode1−1 represents the quantization parameter QP smaller than the predictive quantization parameter QPd by "1".

$$DiffRatio\_1 = Generated\_bits(QP\_precode1-1) - Generated\_bits(QP\_precode\ 1))/Generated\_bits(QP\_precode\ 1) \quad (7)$$

When the quantization parameter QP is incremented by "1", DiffRatio_2 which represents how percent the high-precision generated code quantity changes is obtained from the result of the second pre-encoding as shown in Expression (8). QP_precode1+1 represents the quantization parameter QP greater than the predictive quantization parameter QPd by "1".

$$DiffRatio\_2 = Generated\_bits(QP\_precode\ 1) - Generated\_bits(QP\_precode\ 1+1))/Generated\_bits(QP\_precode\ 1+1) \quad (8)$$

The variation DiffRatio of the high-precision generated code quantity near the predictive quantization parameter QPd is obtained as shown in Expression (9). That is, DiffRatio is calculated as the average value of variations of the generated code quantity when there is change from the predictive quantization parameter QPd by "1" in the positive and negative directions.

$$DiffRatio = (DiffRatio\_1 + DiffRatio\_2)/2 \quad (9)$$

It is assumed that DeltaQP is the absolute value of the difference between the quantization parameter QP with the high-precision generated code quantity closest to the target code quantity and the predictive quantization parameter QPd (QP_precode1). At this time, when the quantization parameter QP corresponding to the high-precision generated code quantity closest to the target code quantity is smaller than the quantization parameter QP (QP_precode1−1) smaller than the predictive quantization parameter QPd by 1, the high-precision generated code quantity (Generated_bits (QP)) of the quantization parameter QP with the high-precision generated code quantity closest to the target code quantity is calculated as shown in Expression (10).

$$Generated\_bits(QP) = Generated\_bits(QP\_precode1-1) \times (1.0 + DiffRatio)^{(DeltaQP-1)} \quad (10)$$

When the quantization parameter QP corresponding to the high-precision generated code quantity closest to the target code quantity is greater than the quantization parameter QP (QP_precode1+1) greater than the predictive quantization parameter QPd by 1, the high-precision generated code quantity (Generated_bits (QP)) of the quantization parameter QP with the high-precision generated code quantity closest to the target code quantity is calculated as shown in Expression (11).

$$Generated\_bits(QP) = Generated\_bits(QP\_precode1+1) \times (1.0 + DiffRatio)^{(DeltaQP-1)} \quad (11)$$

That is, the code quantity control section 4 increases and decreases the high-precision generated code quantity when using the quantization parameters QP before and after the predictive quantization parameter QPd by the code quantity according to the variation when the value of the quantization parameter QP changes by "1" centering on the predictive quantization parameter QPd. The code quantity control section 4 can calculate the high-precision generated code quantity when using the quantization parameter QP near the predictive quantization parameter QPd with high precision.

With the above, the code quantity control section 4 selects the quantization parameter QP closest to the target code quantity as the reference quantization parameter QPMB which is used as the average quantization parameter (BaseQP) in the main encoding.

As described above, in the second pre-encoding section 2, pre-encoding is performed with the predictive quantization parameter QPd (QP_precode1) estimated by the first pre-encoding section 1, the quantization parameter QP (QP_precode1+1) greater than the predictive quantization parameter QPd by 1, and the quantization parameter QP (QP_precode1−1) smaller than the predictive quantization parameter QPd by 1. In order to reduce circuit scale, as described above, only the quantization section 23 and the entropy code length calculation section 24 are parallelized, and other kinds of processing are shared.

At this time, it is assumed that a local decode picture which is used in the intra-screen prediction processing is data quantized with the predictive quantization parameter QPd (QP_precode1) estimated on the basis of the result of the first pre-encoding section 1. That is, data subjected inverse quantization and IDCT is an output of quantization of the predictive quantization parameter QPd (QP_precode1).

This means that an input of the intra-screen prediction processing of pre-encoding which uses the quantization parameters QP (QP_precode1+1, QP_precode1−1) before and after the predictive quantization parameter QPd replaces the local decode picture of the quantization parameter QP with the local decode picture the predictive quantization parameter QPd (QP_precode1).

In this way, the code quantity control section 4 calculates the high-precision generated code quantity by the same coding as the main encoding with the predictive quantization parameter QPd in which the low-precision generated code quantity is extremely likely to be closest to the target code quantity and the quantization parameters QP before and after the predictive quantization parameter QPd by the prediction of the low-precision generated code quantity based on the result of the first pre-encoding section 1. Accordingly, the code quantity control section 4 can substantially calculate the high-precision generated code quantity when using the predictive quantization parameter QPd and the quantization parameters QP before and after the predictive quantization parameter QPd.

The embodiment of the present technology has focused that the variation of the high-precision generated code quantity with change in the quantization parameter QP is substantially uniform in a narrow range. The code quantity control section 4 calculates the high-precision generated code quantity when using the quantization parameter QP near the predictive quantization parameter QPd on the basis of the variation of the high-precision generated code quantity in the predictive quantization parameter QPd and the quantization parameters QP before and after the predictive quantization parameter QPd. Accordingly, the code quantity control section 4 can substantially accurately calculate high-precision generated code quantity even for the quantization parameter QP near the predictive quantization parameter QPd.

1-4. Back Search Processing

The previous mode estimation pre-encoding section 40 performs the back search processing to obtain quantization parameter QP used in the previous coding. At this time, the predictive quantization matrix Q MatrixD obtained by the first pre-encoding section 1 is used, and estimation processing is performed on the quantization parameter QP in a given range up and down with the predictive quantization parameter QPd obtained by the first pre-encoding section 1 as a starting point, whereby the search range of the back search processing is restricted and circuit scale is reduced.

Here, "back search" refers to a method in which, if a quantization step used in the previous compression coding or a quantization step having a multiple relationship therewith is used, a quantization step relating to a minimum value is obtained as an optimum quantization step using the property that the sum of the residual of the discrete cosine transfer (DCT) coefficient is minimal.

The back search section 43 includes a quantization parameter QP detection function and an intra-screen prediction mode detection function. The back search section 43 detects the quantization parameter QP used in the previous encoding on the basis of the DCT coefficient obtained during the previous encoding by the quantization parameter QP detection function. Hereinafter, the detected quantization parameter QP is called a detected quantization parameter QPe.

Specifically, the back search section 43 detects the detected quantization parameter QPe using the residual when the DCT coefficient is divided by a rescaling factor RF by a plurality of quantization parameters QP for each MB. The back search section 43 detects the intra-screen prediction mode used in the precious coding on the basis of the detected quantization parameter QPe by the intra-screen prediction mode detection function. In this embodiment, for reduction of processing, only the detection of the detected quantization parameter QPe and the intra-screen prediction mode is executed as back search.

The entropy code length calculation section 46 selects the same scheme as entropy coding of the main encoding by the main encoding section 3 from CABAC/CAVLC. The previous mode estimation pre-encoding section 40 calculates the back search generated code quantity on the basis of the detected quantization parameter QPe and the detected intra-screen prediction mode. The code quantity control section 4 determines whether or not the target code quantity is satisfied from the back search generated code quantity obtained in this way.

The code quantity control section 4 determines whether encoding is performed in the raw picture mode or encoding is performed in the dubbing mode from the result of the second pre-encoding section 2 and the previous mode estimation pre-encoding section 40, and determines parameters of final encoding. The code quantity control section 4 delivers the determination result of the raw picture mode/dubbing mode, the reference quantization parameter QPMB, the predictive quantization matrix Q MatrixD, the intra-screen prediction mode, and the activity group (hereinafter, these are collectively referred to as "main encoding information") of each MB to the main encoding section 3.

As a result, the main encoding section 3 progresses to either the raw picture mode or the dubbing mode and performs encoding using the main encoding information according to the raw picture mode and the dubbing mode. If the input image 91 delayed through the delay buffer 6 is received, the main encoding section 3 uses the intra-screen prediction mode determined by the first pre-encoding section 1 and generates differential image data between the predicted image and the input image by the intra-screen prediction processing section 31. The DCT section 32 performs DCT processing, and the quantization section 33 performs quantization of the DCT coefficient.

The output of the quantization section 33 is also sent to the inverse quantization section 37. The inverse quantization section 37 performs inverse quantization and reproduces the DCT coefficient. The IDCT section 36 performs IDCT on the DCT coefficient, reproduces the input image, and stores the input image in the buffer 35. In this way, entropy coding is made by the entropy coding section 34 through DCT by the DCT section 32 and quantization of the DCT coefficient by the quantization section 33 described above, and an output stream 92 having the target code quantity is output.

1-5. Selection of Mode for Non-Raw Picture

The raw picture mode/dubbing mode determination processing will be described. As described above, the detected quantization parameter QPe is detected from the MB to be processed by the back search section 43. At this time, even if the input image 91 is a raw picture, there is a case where back search is successful incidentally and the detected quantization parameter QPe is detected. Conversely, if the input image 91 is a non-raw picture, there is a case where back search is not successful incidentally and the detected quantization parameter QPe is not detected.

Accordingly, the code quantity control section 4 determines whether or not the picture in the input image 91 being currently processed is a non-raw picture depending on whether or not the success rate of back search is equal to or greater than a threshold value. In principle, in the dubbing mode which is used when the picture is a non-raw picture, the detected quantization parameter QPe is used for the MB in which back search is successful. Meanwhile, the reference quantization parameter QPMB and the offset by activity are used for the MB in which back search is not successful.

At this time, in any combination, there is a case where the back search generated code quantity of the picture exceeds the target code quantity. For this reason, when it is determined that the picture is a non-raw picture, the code quantity control section 4 calculates the back search generated code quantity in the dubbing mode. When the back search generated code quantity falls within the target code quantity, the dubbing mode is selected, and when the back search generated code quantity does not fall within the target code quantity, the raw picture mode is selected.

Specifically, the code quantity control section 4 calculates the sum (GenBits_success) of the generated code quantities of the MBs (hereinafter, referred to as "success MB") in which back search is successful. In the success MBs, the detected quantization parameter QPe is used directly without taking activity into consideration. For this reason, the code quantity control section 4 uses generated code quantity calculated by the previous mode estimation pre-encoding section 40 and calculates the sum (GenBits_success) of the generated code quantities for the success MBs.

The code quantity control section 4 calculates the sum (GenBits_not_success) of the generated code quantities when using the reference quantization parameter QPMB on the basis of the high-precision generated code quantity calculated in the second pre-encoding section 2 for the MBs (hereinafter, referred to as "not-success MB") in which back search is not successful. As described above, in the second pre-encoding section 2, the variation (Diffratio) when the quantization parameter QP changes by "1" and the reference quantization parameter QPMB are calculated.

The code quantity control section 4 multiples the variation (Diffratio) to the sum (GenBits_not_success) of the generated code quantities by the number of times corresponding to the difference value (Diff_QP) between the predictive quantization parameter QPe and the reference quantization parameter QPMB, thereby calculating the generated code quantity (GenBits_not_success_rev) when using the reference quantization parameter QPMB for the not-success MBs.

That is, when the reference quantization parameter QPMB is greater than the predictive quantization parameter QPd, the generated code quantity (GenBits_not_success_rev) is obtained as shown in Expression (12). When the reference quantization parameter QPMB is smaller than the predictive quantization parameter QPd, the generated code quantity (GenBits_not_success_rev) is obtained as shown in Expression (13).

$$\text{GenBits\_not\_success\_rev} = \text{GenBits\_not\_success} \times (1.0 + \text{Diffratio})^{\text{Diff\_QP}} \quad (12)$$

$$\text{GenBits\_not\_success\_rev} = \text{GenBits\_not\_success} \times (1.0 - \text{Diffratio})^{\text{Diff\_QP}} \quad (13)$$

The code quantity control section 4 adds the generated code quantity (GenBits_success) of the success MB and the generated code quantity (GenBits_not_success_rev) of the not-success MB, whereby the back search generated code quantity (GenBits_rev) of the picture when using the dubbing mode is calculated as shown in Expression (14).

$$\text{GenBits\_rev} = \text{GenBits\_success} + \text{GenBits\_not\_success\_rev} \quad (14)$$

Next, the code quantity control section 4 determines whether or not the back search generated code quantity (GenBits_rev) of the picture falls within the target code quantity. The code quantity control section 4 compares the back search generated code quantity (GenBits_rev) of the picture with the target code quantity (TargetBit) in accordance with Expression (15). α is an added code quantity which is determined depending on how much the swing of the code quantity is allowable.

$$\text{GenBits\_rev} \leq (\text{TargetBits} + \alpha) \quad (15)$$

When the back search generated code quantity (GenBits_rev) of the picture falls within the target code quantity, the code quantity control section 4 selects the dubbing mode. When the back search generated code quantity (GenBits_rev) of the picture does not fall within the target code quantity, since there is a possibility that the back search generated code quantity (GenBits_rev) of the picture does not fall within the target code quantity due to an error when the generated code quantity (GenBits_not_success_rev) of the not-success MB is calculated by computation, the code quantity control section 4 verifies the possibility.

The code quantity control section 4 compares the generated code quantity (GenBits) before correction of the picture obtained by adding the generated code quantity (GenBits_success) of the success MB and the generated code quantity (GenBits_not_success) when using the predictive quantization parameter QPd of the non-success MB with the target code quantity (TargetBit) in accordance with Expression (16).

$$\text{GenBits} \leq (\text{TargetBits} + \alpha) \quad (16)$$

When the generated code quantity (GenBits) before correction of the picture exceeds the target code quantity (TargetBit), even in a state where there is no error caused by computational calculation, since the generated code quantity exceeds the target code quantity (TargetBit), the code quantity control section 4 selects the raw picture mode.

Although the previous mode estimation pre-encoding section 40 uses the input image 91 as a predicted image in the intra-screen prediction processing section 41, when encoding is performed on a picture encoded once with the same parameters, distortion does not remain. Incidentally, the input image 91 and the local decode image become identical, and no error remains on the code quantity. Accordingly, when a detection rate is high, an error caused by use of the input image 91 as a predicted image is very small and negligible.

In this way, when the picture is a non-raw picture, the code quantity control section 4 predicts the back search generated code quantity of the picture when using the dubbing mode, and when the back search generated code quantity of the picture falls within the target code quantity, selects the dubbing mode. When the back search generated code quantity of the picture does not fall within the target code quantity, the code quantity control section 4 selects the raw picture mode.

1-6. Main Encoding

If the encoding mode is the raw picture mode, the intra-screen prediction processing section 31 of the main encoding section 3 uses the intra-screen prediction mode determined by the intra-screen prediction mode determination section 11 for the MB to be processed. The quantization section 33 uses the reference quantization parameter QPMB determined in accordance with the result of the second pre-encoding section 2.

If the encoding mode is the dubbing mode, the intra-screen prediction processing section 31 changes the intra-screen prediction mode to be used for each MB to be processed. That is, when back search is successful in the MB to be processed, the intra-screen prediction processing section 31 uses the intra-screen prediction mode detected by the back search section 43. When back search is not successful in the MB to be processed, the intra-screen prediction processing section 31 uses the primary intra-screen prediction mode detected by the first pre-encoding section 1.

At this time, the quantization section 33 changes the quantization parameter QP to be used for each MB to be processed. That is, when back search is successful in the MB to be processed, the intra-screen prediction processing section 31 selectively uses the reference quantization parameter QPMB determined on the basis of the result of the second pre-encoding section 2 or the detected quantization parameter QPe detected by the back search section 43 in accordance with the determination result of the need for the code quantity suppression.

That is, if it is determined that there is no need for code quantity suppression, the code quantity control section 4 performs control that the quantization section 33 uses the detected quantization parameter QPe. If it is determined that there is a need for code quantity suppression, the code quantity control section 4 performs control such that the quantization section 33 uses the detected quantization parameter QPe if the detected quantization parameter QPe is not smaller than the reference quantization parameter QPMB. If it is determined that there is a need for code quantity suppression, the code quantity control section 4 performs control such that the quantization section 33 uses the reference quantization parameter QPMB when the detected quantization parameter QPe is smaller than the reference quantization parameter QPMB.

As described below, the detected quantization parameter QPe is subjected to feedback control such that the picture generated code quantity does not exceed the picture target code quantity. When an integrated value of the generated code quantity to a last feedback control unit is greater than an integrated value of the target code quantity to a last feedback control unit, the code quantity control section 4 determines that there is a need for code quantity suppression.

The reference quantization parameter QPMB is used as an average quantization parameter (BaseQP) and attached with the offset according to the activity group determined by the first pre-encoding section 1. The quantization section 33 uses the predictive quantization matrix Q MatrixD determined as the quantization matrix Q Matrix by the first pre-encoding section 1 regardless of the presence/absence of success of back search.

1-7. Feedback Control in Main Encoding

As described above, the image processing apparatus 100 executes the main encoding by feedforward control using the reference quantization parameter QPMB which is predicted that main encoding generated code quantity becomes closest to the target code quantity. For this reason, inmost cases, the image processing apparatus 100 can suppress the main encoding generated code quantity to the target code quantity.

However, the image processing apparatus 100 rarely fails to calculate the high-precision generated code quantity and selects an inappropriate reference quantization parameter QPMB. Accordingly, in order to cope with this case, the image processing apparatus 100 reliably suppresses the main encoding generated code quantity to the target code quantity by feedback control of the main encoding generated code quantity.

The code quantity control section 4 determines, as the reference quantization parameter QPMB, the quantization parameter QP in which the high-precision generated code quantity does not exceed the target code quantity and the high-precision generated code quantity is closest to the target code quantity. Accordingly, the code quantity control section 4 determines the reference quantization parameter QPMB such that the main encoding generated code quantity becomes slightly smaller than the target code quantity.

The image processing apparatus 100 performs rate control by intra-screen feedback in the main encoding of three-pass encoding and suppresses the code quantity to be equal to or smaller than a given value. In order to suppress unwanted variation of the quantization parameter QP by feedback control, if it is predicted that the generated code quantity of each picture does not exceed the target code quantity, the image processing apparatus 100 changes the use quantization parameter QP to the reference quantization parameter QPMB only depending on visual performance (activity). That is, the image processing apparatus 100 sets an adaptive quantization parameter QPt when the reference quantization parameter QPMB is set as the average quantization parameter BaseQP of the picture, as the use quantization parameter QP.

If it is predicted that the main encoding generated code quantity exceeds the target code quantity by feedback control, the image processing apparatus 100 changes the quantization parameter BaseQP from the reference quantization parameter QPMB. At this time, in order to suppress unwanted variation of the average quantization parameter BaseQP, the image processing apparatus 100 changes the average quantization parameter BaseQP only in a direction in which the quantization parameter QP increases and accordingly in a direction in which the generated code quantity decreases. As a result, the image processing apparatus 100 sets the adaptive quantization parameter QPt based on the changed average quantization parameter BaseQP as the use quantization parameter QP. The average quantization parameter BaseQP which is changed to an increasing direction once is not returned to a decreasing direction.

Specifically, the main encoding section 3 of the image processing apparatus 100 sets the reference quantization parameter QPMB determined on the basis of the result of the second pre-encoding section 2 as the average quantization parameter BaseQP and performs encoding using the quantization matrix Q Matrix and Activity Group determined by the first pre-encoding section 1. At this time, the image processing apparatus 100 performs feedback control on the average quantization parameter BaseQP so as not to exceed the target code quantity.

The code quantity control section 4 of the image processing apparatus 100 executes feedback control for each feedback control unit (FeedBackUnit) having a plurality of MBs. The generated code quantity of the output stream 92 is supplied from the entropy coding section 34 to the code quantity control section 4. The code quantity control section 4 uses the generated code quantity (that is, the output of the quantization section 23-1 and the entropy code length calculation section 24-1) for each MB with the predictive quantization parameter QPd (QP_precode1) of the second pre-encoding, and calculates the target code quantity (hereinafter, referred to as "feedback target code quantity") for each feedback control unit from the target code quantity (hereinafter, referred to as "picture target code quantity") for each picture.

Now, if the high-precision generated code quantity for each feedback control unit based on the result of the second pre-encoding section 2 is PrecodeGeneratedBits_FeedBackUnit[no], and the high-precision generated code quantity for each picture based on the result of the second pre-encoding section 2 is PrecodeGeneratedBits, the feedback target code quantity (TargetBit_FeedBackUnit[no]) for each feedback control unit is obtained by Expression (17). Note that "no" represents the number (0 to the number of FeedBackUnit−1) of the feedback control unit, and "TargetBit" represents the picture target code quantity.

$$\text{TargetBit\_FeedBackUnit[no]} = \text{TargetBit} \times \text{PrecodeGeneratedBits\_FeedBackUnit[no]} / \text{PrecodeGeneratedBits} \quad (17)$$

That is, the code quantity control section 4 multiples the picture target code quantity TargetBit to the ratio of the high-precision generated code quantity (PrecodeGeneratedBits_FeedBackUnit[no]) for each feedback control unit to the high-precision generated code quantity (PrecodeGeneratedBits) of the picture to calculate the feedback target code quantity (TargetBit_FeedBackUnit[no]).

Specifically, the code quantity control section 4 of the image processing apparatus 100 performs the following processing.

(1) The code quantity control section 4 divides encoding into first half processing and second half processing, and does not perform feedback control in the first half processing. The code quantity control section 4 determines the target code quantity for each feedback control unit (FeedBackUnit) by the code quantity ratio for each feedback control unit (FeedBackUnit) of pre-encoding.

The code quantity ratio changes with the change of the quantization parameter QP. Accordingly, if feedback control is performed when the generated code quantity of the first half of encoding is small, there is a possibility that the image processing apparatus 100 unnecessarily change the average quantization parameter BaseQP. In other words, the image processing apparatus 100 selects the reference quantization parameter QPMB such that the main encoding generated code quantity becomes close to the picture target code quantity. The reason is that, if the average quantization parameter BaseQP changes in an early stage of the picture, the main encoding generated code quantity and the picture target code quantity are separated from each other.

(2) The code quantity control section 4 determines the switching timing of the first half processing and the second half processing from the viewpoint of both the stabilization of the quantization parameter QP and the suppression of the main encoding generated code quantity to be equal to or smaller than the target code quantity. That is, when one of the following conditions shown in (a) and (b) is satisfied, the code quantity control section 4 progresses to the second half processing.

(a) The code quantity control section 4 progresses to the second half processing when the picture is encoded at a given ratio or more, in other words, when a given number of MBs or more are encoded. This is to stabilize the quantization parameter QP.

(b) The code quantity control section 4 compares the remaining code quantity (a value obtained by subtracting the main encoding generated code quantity to this time from the picture target code quantity) which can be used in an un-encoded portion (MB) with the target code quantity (a value obtained by subtracting the feedback target code quantity to this time from the picture target code quantity) of the un-encoded portion (MB). If the remaining code quantity is equal to or smaller than a given ratio, the processing progresses to the second half processing. This is to suppress the main encoding generated code quantity to be equal to or smaller than the target code quantity.

The condition (b) in (2) is as shown in Expression (18).

$$(TargetBit-GeneratedBits\_Accum) < (TargetBit-TargetBits\_Accum) \times ThresholdRatio \quad (18)$$

TargetBit_Accum and GeneratedBits_Accum are respectively the integrated values of the feedback target code quantity (TargetBit_FeedBackUnit[no]) and the main encoding generated code quantity (GeneratedBits_FeedBackUnit[no]) for each feedback control unit. ThresholdRatio is a ratio of allowable deviation.

When the main encoding generated code quantity becomes the target code quantity, the remaining code quantity becomes equal to the target code quantity of the un-encoded portion. When the main encoding generated code quantity is over the target code quantity, the remaining code quantity becomes smaller than the target code quantity of the un-encoded portion.

For example, when the remaining code quantity is less than the target code quantity of the un-encoded portion ThresholdRatio times, the code quantity control section 4 progresses to the second half processing. When control is performed such that the generated code quantity necessarily falls below the target code quantity, the code quantity control section 4 sets ThresholdRatio to be less than 1. Accordingly, the code quantity control section 4 can progresses to the second half processing when the generated code quantity of an encoded portion falls below the target code quantity and approaches the target code quantity.

When control is performed such that the generated code quantity is near the target code quantity, the code quantity control section 4 sets ThresholdRatio to be more than 1. Accordingly, the code quantity control section 4 can progress the second half processing when the generated code quantity of the encoded portion exceeds the target code quantity at a given ratio or more. Of course, ThresholdRatio may be set to "1". Accordingly, the code quantity control section 4 can enter feedback control before the target code quantity and the actual main encoding generated code quantity are separated from each other, and it is possible to reliably prevent the main encoding generated code quantity from being not controlled because the remaining code quantity is excessively small.

In other words, when the main encoding generated code quantity is small, since the absolute amount of the remaining code quantity is large, there is no case where the code quantity control section 4 processes the second half processing and enters the feedback control with the condition being satisfied insofar as the target code quantity and the main encoding generated code quantity are excessively separated from each other. If the main encoding generated code quantity increases, since the absolute amount of the remaining code quantity is small, even if the target code quantity and the main encoding generated code quantity are shifted by a small amount, the code quantity control section 4 progresses to the second half processing and enters the feedback control.

(3) The code quantity control section 4 changes the average quantization parameter BaseQP in a direction to be greater than the reference quantization parameter QPMB only when it is predicted in the second half processing that the main encoding generated code quantity for each picture exceeds the picture target code quantity. When increasing the average quantization parameter BaseQP, the code quantity control section 4 changes the average quantization parameter BaseQP only by "1" with single feedback processing (for each feedback control unit). Accordingly, the code quantity control section 4 suppresses excessive change of the average quantization parameter BaseQP.

When one of the conditions (a) and (b) is satisfied, the code quantity control section 4 predicts that the main encoding generated code quantity for each picture exceeds the picture target code quantity, and increases the average quantization parameter BaseQP.

(a) The code quantity control section 4 confirms the last feedback generated code quantity when encoding in a feedback control unit ends (immediately after the processing ends), and compares the feedback generated code quantity (GeneratedBits_FeedBackUnit[cur]) with the feedback target code quantity (TargetBit_FeedBackUnit[cur]) in accordance with Expression (19).

$$GeneratedBits\_FeedBackUnit[cur] < TargetBit\_FeedBackUnit[cur] \quad (19)$$

The reason for the feedback generated code quantity (GeneratedBits_FeedBackUnit[cur]) greater than the feedback target code quantity (TargetBit_FeedBackUnit[cur]) is that the generated code quantity tends to increase, and this suggests there is a possibility that the main encoding generated code quantity to be generated in subsequent encoding exceeds the target code quantity. At this time, the code quantity control section 4 determines whether or not to increase the average quantization parameter BaseQP. The condition at this time is described below.

The code quantity control section 4 subtracts the generated code quantity from the target code quantity for the encoded portion at this time, thereby calculating the surplus SurplusBits of the generated code quantity as shown in Expression (20).

$$SurplusBits = Target\_Accum - GeneratedBits\_Accum \quad (20)$$

The code quantity control section 4 increases the average quantization parameter BaseQP when it is predicted that the main encoding generated code quantity exceeds the target code quantity in the next feedback control unit.

The code quantity control section 4 obtains the maximum code quantity (hereinafter, "excess maximum code quantity"), which is predicted to be over the target code quantity of the next feedback control unit in the next feedback control unit, from the target code quantity of the next feedback control unit as shown in Expression (21).

$$\text{TargetBit\_FeedBackUnit[next]} \times \text{MaxErrorRatio} \quad (21)$$

MaxErrorRatio is a possible maximum ratio of the feedback generated code quantity as an error with respect to the feedback target code quantity. From this, the determination of Expression (22) is made.

$$\text{SurplusBits} < \text{TargetBit\_FeedBackUnit[next]} \times \text{MaxErrorRatio} \quad (22)$$

The code quantity control section 4 compares the surplus SurplusBits of the generated code quantity with the excess maximum code quantity of the next feedback control unit. When the excess maximum code quantity is larger than the surplus SurplusBits of the generated code quantity, the code quantity control section 4 determines there is a possibility that the main encoding generated code quantity of the encoded portion in the next feedback control exceeds the target code quantity, and increases the average quantization parameter BaseQP by "1".

That is, the code quantity control section 4 increases the average quantization parameter BaseQP by "1" when "the generated code quantity of the last feedback control unit is greater than the target code quantity of the last feedback control unit" and "the surplus SurplusBits of the code quantity at this time is smaller than the excess maximum code quantity which is possible to be over in the next feedback control". Since the generated code quantity tends to increase, and there is no margin in the surplus of the code quantity, it is predicted that the final picture generated code quantity exceeds the picture target code quantity.

In other words, if it is determined that the main encoding generated code quantity of the encoded portion in the next feedback control unit does not exceed the target code quantity in status quo, the code quantity control section 4 does not increase the average quantization parameter BaseQP by "1". Accordingly, even when an indication that the main encoding generated code quantity of the encoded portion exceeds the target code quantity is found, the code quantity control section 4 can avoid an excessive response, can prevent the average quantization parameter BaseQP from increasing unnecessarily, and can stabilize the average quantization parameter BaseQP.

(b) When the condition (a) is not satisfied, that is, when "the generated code quantity of the last feedback control unit is smaller than the target code quantity of the last feedback control unit" or "the surplus SurplusBits of the code quantity at this time is greater than the excess maximum code quantity which is possible to be over in the next feedback control", the code quantity control section 4 confirms whether or not the surplus SurplusBits of the generated code quantity is negative.

When SurplusBits is negative, this means that the main encoding generated code quantity at the end of encoding exceeds the target code quantity. At this time, as described below, the code quantity control section 4 predicts the shift of the generated code quantity in the remaining coded portion from the target in the remaining coded portion from the ratio of the target code quantity of the last feedback control unit and the generated code quantity.

The code quantity control section 4 calculates the ratio Diff_Ratio of the target code quantity of the last feedback control unit and the generated code quantity as shown in Expression (23).

$$\text{Diff\_Ratio(GeneratedBitsFeedBackUnit[cur]} - \text{TargetBit\_FeedBackUnit[cur]} / \text{TargetBit\_FeedBackUnit[cur]} \quad (23)$$

The code quantity control section 4 calculates the target code quantity TargetBit_Rem of the remaining coded portion as shown in Expression (24).

$$\text{TargetBit\_Rem} = \text{TargetBit} - \text{TargetBit\_Accum} \quad (24)$$

The code quantity control section 4 assumes that the generated code quantity in the remaining coded portion is shifted at the same ratio as the ratio Diff_Ratio of the target code quantity of the last feedback control unit and the generated code quantity, and calculates the shift from the target as shown in Expression (25).

$$\text{TargetBit\_Rem} \times \text{Diff\_Ratio} \quad (25)$$

When the addition result of the shifts of the coded portion and the un-coded portion is positive, and when the condition of Expression (26) is satisfied, the code quantity control section 4 increases the quantization parameter BaseQP by "1".

$$(\text{TargetBit\_Rem} \times \text{Diff\_Ratio}) - \text{SurplusBits} > 0 \quad (26)$$

When "the generated code quantity of the encoded portion exceeds the target code quantity" and "the predictive generated code quantity of the picture obtained from the ratio of the target code quantity of the last feedback control unit and the generated code quantity exceeds the picture target code quantity", the code quantity control section 4 increases the average quantization parameter BaseQP by "1". That is, even when the generated code quantity exceeds the target code quantity at a certain time, if it is determined that the generated code quantity tends to decrease with respect to the target code quantity and finally the picture generated code quantity falls below the picture target code quantity, the code quantity control section 4 does not increase the average quantization parameter BaseQP by "1".

In this way, the image processing apparatus 100 does not execute the feedback control at the start of the main encoding on the picture when performing the main encoding on the input image 91, and executes the feedback control as the second half processing only when a given condition is satisfied. That is, in principle, the image processing apparatus 100 executes the feedback control on the second half portion of the picture. In regard to the first half portion of the picture, when the ratio of the generated code quantity of the encoded portion and the target code quantity is equal to or greater than a given value, since there is a possibility that the subsequent generated code quantity is separated from the target code quantity, the image processing apparatus 100 executes the feedback control.

As the feedback control, in order to suppress change of the average quantization parameter BaseQP to the minimum, the image processing apparatus 100 increases the average quantization parameter BaseQP by "1" only when it is predicted that it is not possible to suppress the main encoding generated code quantity for each picture to be equal to or smaller than the picture target code quantity.

That is, when the feedback generated code quantity is greater than the feedback target code quantity, the generated code quantity tends to increase more than the target code quantity, and there is a possibility that the generated code quantity of the encoded portion in the next feedback control unit exceeds the target code quantity, since it is predicted that the final picture generated code quantity exceeds the picture target code quantity, the image processing apparatus 100 increases the average quantization parameter BaseQP by "1".

Accordingly, even if the generated code quantity tends to increase more than the target code quantity, when there is a margin in the remaining code quantity, it is possible to configure the image processing apparatus 100 so as not to increase the average quantization parameter BaseQP by "1", whereby the average quantization parameter BaseQP is not increased unnecessarily.

When an increase of the average quantization parameter BaseQP by "1" is not performed, if it is predicted that the generated code quantity of the encoded portion exceeds the target code quantity, and the final generated code quantity of the picture exceeds the picture target code quantity, the image processing apparatus 100 increases the average quantization parameter BaseQP by "1". Accordingly, even if the generated code quantity of the encoded portion exceeds the target code quantity, when the generated code quantity tends to decrease, and it is predicted that the generated code quantity of the picture does not exceed the picture target code quantity, it is possible to configure the image processing apparatus 100 so as not to increase the final average quantization parameter BaseQP by "1", whereby the average quantization parameter BaseQP is not increased unnecessarily.

Figure 4:
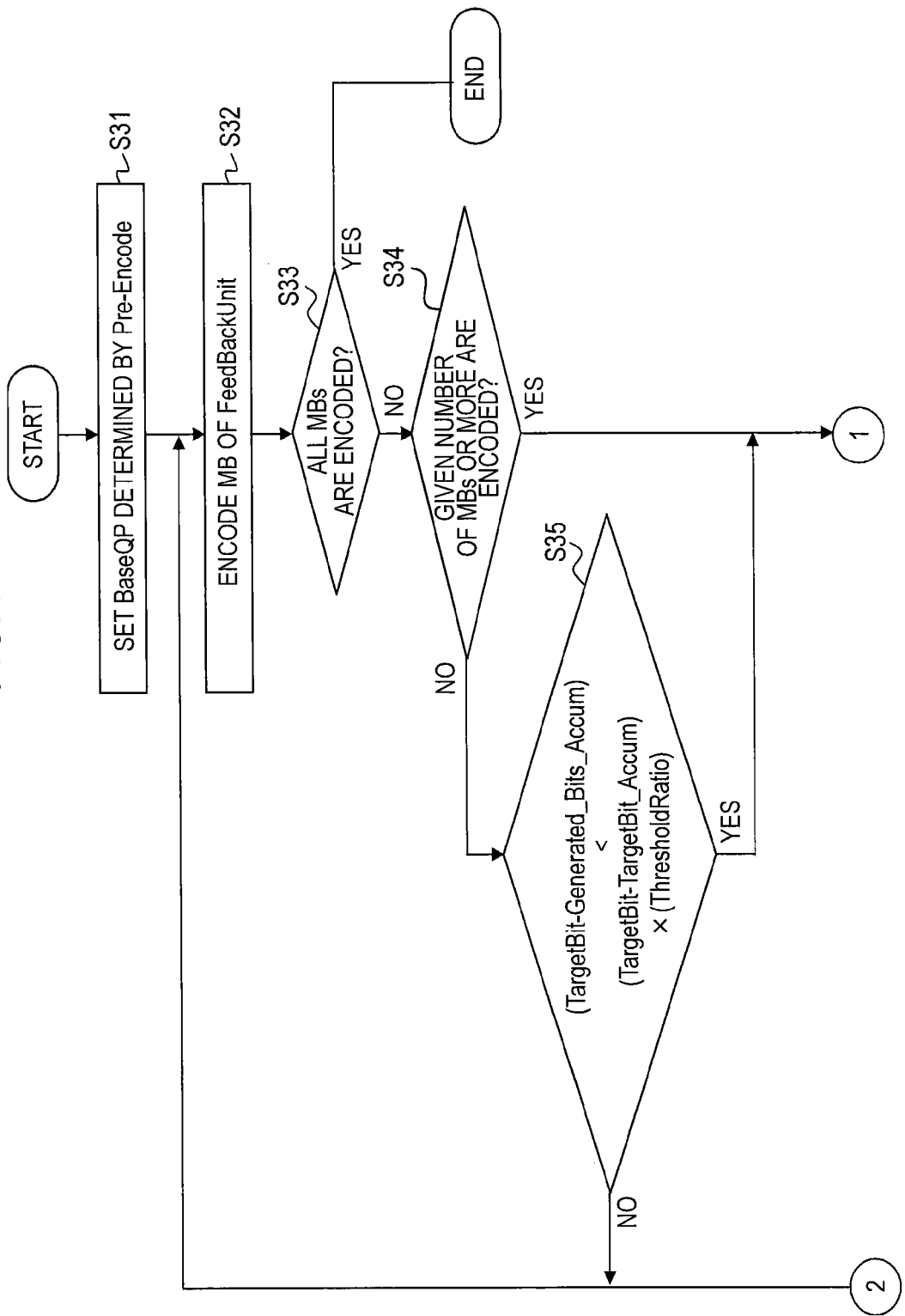
FIG. 4 is a flowchart (1/2) showing an example of a processing procedure of feedback control.
Figure 5:
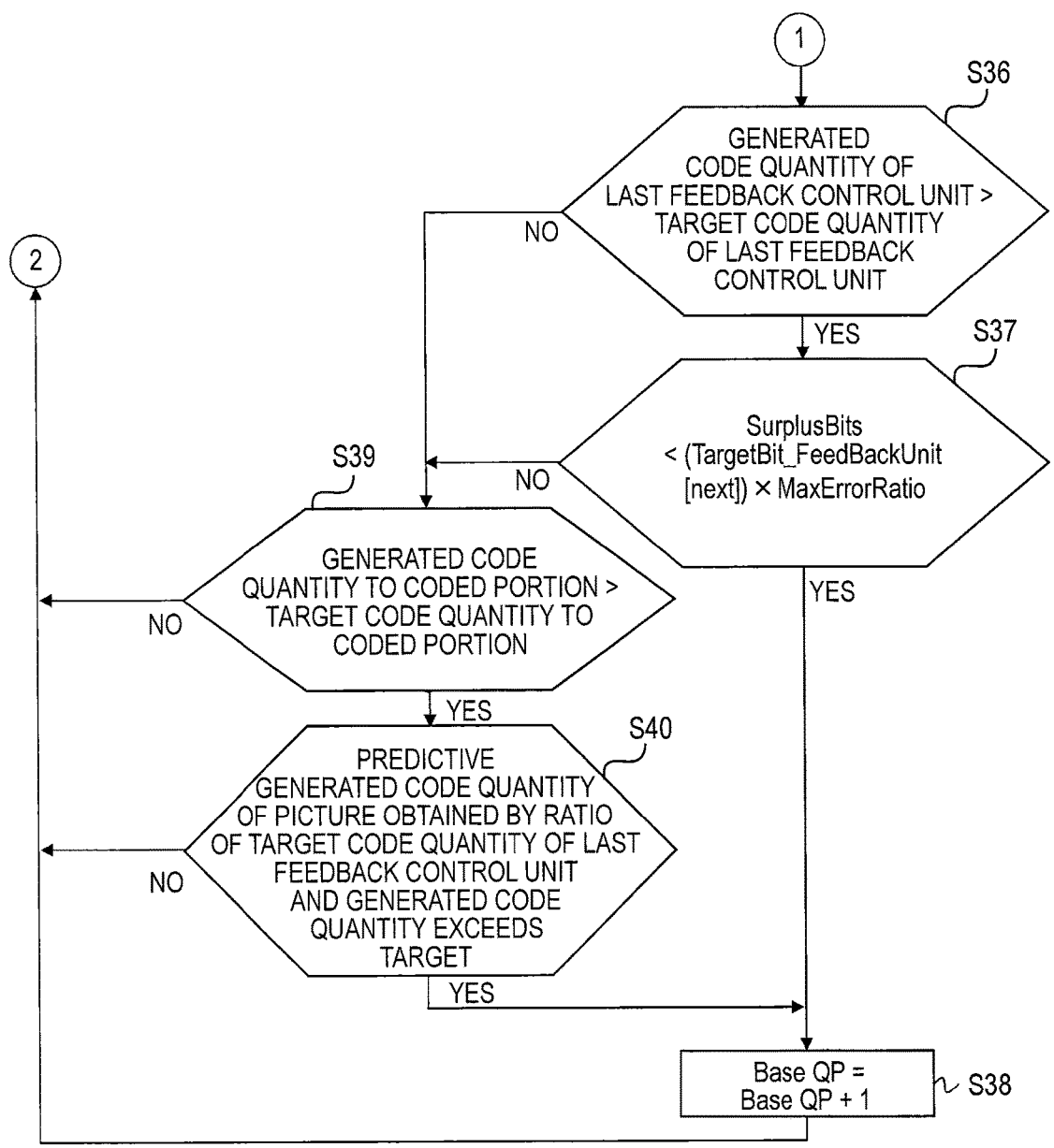
FIG. 5 is a flowchart (2/2) showing an example of a processing procedure of feedback control.

A processing procedure of the feedback control will be described referring to the flowcharts of FIGS. 4 and 5. If the processing starts, the code quantity control section 4 sets the reference quantization parameter QPMB determined by pre-encoding as the average quantization parameter BaseQP (Step S31). Subsequently, the code quantity control section 4 encodes the input image 91 for each feedback control unit (FeedBackUnit) (Step S32).

Subsequently, the code quantity control section 4 determines whether or not all MBs in the picture are encoded (Step S33). When all MBs are encoded, the code quantity control section 4 progresses to an end step and the processing ends. When all MBs are not encoded, the code quantity control section 4 progresses to Step S34. The code quantity control section 4 determines whether or not a given number of MBs are encoded (Step S34). As described above, this is because, if the feedback control is performed when the generated code quantity of the first half of encoding is small, there is a possibility that the average quantization parameter BaseQP changes unnecessarily.

When it is determined that a given number of MBs are encoded, the code quantity control section 4 progresses to Step S36. Meanwhile, when it is determined that a given number of MBs are not encoded, the code quantity control section 4 progresses to Step S35. The remaining code quantity (a value obtained by subtracting the generated code quantity to this time from the target code quantity) which can be used in the un-encoded portion (MB) is compared with the target code quantity of the un-encoded portion (MB). It is determined whether or not the ratio of the remaining code quantity and the target code quantity of the un-encoded portion is equal to or smaller than a given ratio (Step S35).

When it is determined that the ratio of the remaining code quantity and the target code quantity of the un-encoded portion is not equal to or smaller than the given ratio, since the Mb being currently subjected to the encoding processing is not the second half portion and the generated code quantity of the encoded portion is not separated from the target code quantity, the code quantity control section 4 returns to Step S32 and repeats the above-described processing. When it is determined that the usable code quantity is equal to or smaller than the given ratio, the code quantity control section 4 progresses to Step S36 and executes the feedback control.

Subsequently, the code quantity control section 4 determines whether or not the generated code quantity of the last feedback control unit is greater than the target code quantity of the last feedback control unit (Step S36). When it is determined that the generated code quantity of the last feedback control unit is greater than the target code quantity of the last feedback control unit, the code quantity control section 4 determines whether or not there is a possibility that the surplus of the code quantity at this time is over in the next feedback control unit (Step S37).

When the generated code quantity of the last feedback control unit is smaller than the target code quantity of the last feedback control unit, the code quantity control section 4 progresses to Step S39. When it is determined that there is a possibility that the surplus of the code quantity at this time is over in the next feedback control, the code quantity control section 4 increases the quantization parameter BaseQP by "1" (Step S38) and returns to Step S32. When it is determined that there is no possibility that the surplus of the code quantity at this time is over in the next feedback control, the code quantity control section 4 progresses to Step S39.

In Step S39, the code quantity control section 4 determines whether or not the generated code quantity of the encoded portion exceeds the target code quantity (Step S39). When it is determined that the generated code quantity of the encoded portion does not exceed the target code quantity, the code quantity control section 4 returns to Step S32 and repeats the above-described processing.

When it is determined that the generated code quantity of the encoded portion exceeds the target code quantity, the code quantity control section 4 determines whether or not the predictive generated code quantity of the picture obtained by the ratio of the target code quantity of the last feedback control unit and the generated code quantity exceeds the picture target code quantity (Step S40). When it is determined that the predictive generated code quantity of the picture does not exceed the picture target code quantity, the code quantity control section 4 returns to Step S32 and repeats the above-described processing.

When it is determined that the predictive generated code quantity of the picture exceeds the picture target code quantity, the code quantity control section 4 increases the average quantization parameter BaseQP by "1" (Step S38), returns to Step S32, and repeats the above-described processing. In this way, the code quantity control section 4 continues the processing until it is determined in Step S33 that all MBs are encoded.

1-8. Processing Procedure of Coding by Image Processing Apparatus

An example of a processing procedure of coding by the image processing apparatus 100 will be described referring to the flowchart of FIG. 6. First, the activity calculation section 16 calculates activity for each MB and divides the MB into activity groups in accordance with this value (Step S1).

Subsequently, the intra-screen prediction mode determination section 11 determines the intra-screen prediction mode on the basis of the input image 91 (Step S2). The intra-screen prediction mode is used in the second pre-encoding by the second pre-encoding section 2 and the main encoding by the main encoding section 3.

Next, the intra-screen prediction processing section 12 calculates differential image data between the predicted image and the input image. As the predicted image herein, the input image 91 for reducing processing is used. Next, the DCT section 13 performs integer-precision DCT and sends the DCT coefficient to the quantization section 14 (Step S3).

The quantization section 14 quantizes the DCT coefficient value with a plurality of selected quantization parameters QP1 at an arbitrary interval as the average quantization parameter (BaseQP) of the picture. The entropy code length calculation section 15 performs variable-length coding on the quantized coefficient and performs code length calculation to acquire the generated code quantity for each selected quantization parameter QP1 (Step S4).

At this time, in the quantization parameter QP of the MB, as described above, the value taking the activity into consideration is given and encoded. That is, as described above, the quantization parameter QP of the MB is obtained by adding the offset depending on the activity group to the average quantization parameter (BaseQP) of the picture.

When matching adaptive quantization matrix Q Matrix switching processing, the above-described processing performs for each quantization matrix Q Matrix. That is, pre-encoding is performed with the selected quantization parameters QP1 having discrete (random) values for each quantization matrix Q Matrix to acquire the generated code quantity for one picture. At this time, the quantization parameters QP1 are selected so as to cover a possible range of the quantization parameters QP for each quantization matrix Q Matrix.

Next, the code quantity control section 4 performs correction processing on the generated code quantity calculated by the first pre-encoding section 1 and calculates the low-precision generated code quantity. The code quantity control section 4 performs correction of an error caused by simplification of pre-encoding, and calculates the low-precision generated code quantity corresponding to the quantization parameters QP other than the selected quantization parameters QP1 by interpolation processing (Step S5). The code quantity control section 4 executes the processing of Step S5 for each quantization matrix Q Matrix and calculates the low-precision generated code quantity for each quantization matrix Q Matrix (Step S6).

With the above processing, since the low-precision generated code quantity is obtained for all necessary quantization parameters QP, of these, the quantization matrix Q Matrix having minimum inclination from among the quantization parameters QP which can generate the low-precision generated code quantity closest to the target code quantity is selected as the predictive quantization matrix Q MatrixD. The code quantity control section 4 selects the quantization parameter QP, which can generate the low-precision generated code quantity closest to the target code quantity corresponding to the predictive quantization matrix Q MatrixD, as the predictive quantization parameter QPd (Step S7).

As described above, if the quantization matrix Q Matrix is selected, the possible range of the quantization parameters QP is restricted, making it possible to decrease the range of the selected quantization parameters QP1 when calculating the low-precision generated code quantity in the first pre-encoding section 1. These become the predictive quantization matrix Q MatrixD and the predictive quantization parameter QPd determined by the first pre-encoding section 1.

Figure 7:
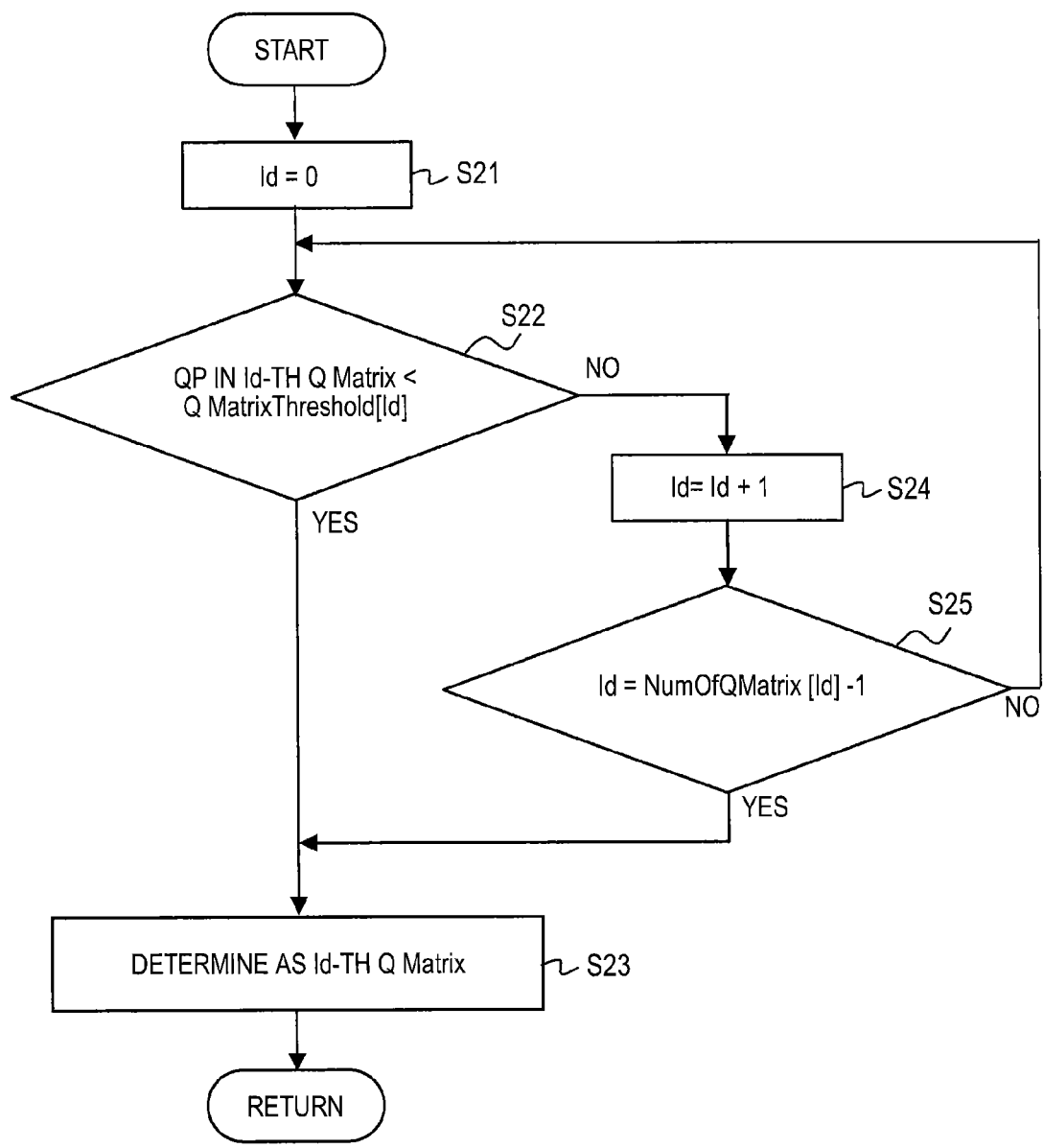
FIG. 7 is a flowchart illustrating Q Matrix determination processing.

A procedure of Q Matrix determination processing in Step S7 will be further described referring to the flowchart of FIG. 7. If the processing starts, first, the code quantity control section 4 initializes Id to Id=0 (Step S21), and then compares the quantization parameter (QP) with the low-precision generated code quantity closet to the target code quantity from the quantization matrix Q Matrix having. ID of a small value with the possible maximum quantization parameter QP (Q MatrixThreshold [Id]) in the quantization matrix Q Matrix (Step S22).

If the quantization parameter (QP) in which the low-precision generated code quantity in the Id-th quantization matrix Q Matrix is closest to the target code quantity is smaller than QMatrixThreshold[Id], the code quantity control section 4 determines the present quantization matrix Q Matrix as the predictive quantization matrix Q MatrixD. If the quantization parameter (QP) with the low-precision generated code quantity closest to the target code quantity in the predictive quantization matrix Q MatrixD is determined as the predictive quantization parameter QPd (Step S23), the code quantity control section 4 ends the Q Matrix determination processing procedure.

In Step S22, if the quantization parameter (QP) with the low-precision generated code quantity closest to the target code quantity in the Id-th quantization matrix Q Matrix is equal to or greater than QMatrixThreshold[Id], the code quantity control section 4 increments Id (Step S24). The code quantity control section 4 determines whether or not Id=value smaller than the total number of quantization matrixes Q Matrix by "1", that is, NumOfQMatrixId−1 (Step S25).

If Id=NumOfQMatrixId−1, the procedure returns to Step S22, and the next quantization matrix Q Matrix is checked. If Id=NumOfQMatrixId−1, the quantization matrix Q Matrix (the quantization matrix Q Matrix having Id of NumOfQMatrixId) having maximum inclination is selected (Step S23), and the Q Matrix determination processing procedure ends.

With the Q Matrix determination processing procedure of the flowchart of FIG. 7, the code quantity control section 4 sets the possible maximum quantization parameter QP for each quantization matrix Q Matrix. It is determined whether or not the low-precision generated code quantity corresponding to the quantization parameter QP in which the low-precision generated code quantity is estimated to be closest to the target code quantity is actually close to the target code quantity in order from the quantization matrix Q Matrix having gentle inclination. If the low-precision generated code quantity is close to the target code quantity, the corresponding quantization matrix Q Matrix is determined as the predictive quantization matrix Q MatrixD which is used in the main encoding.

Figure 6:
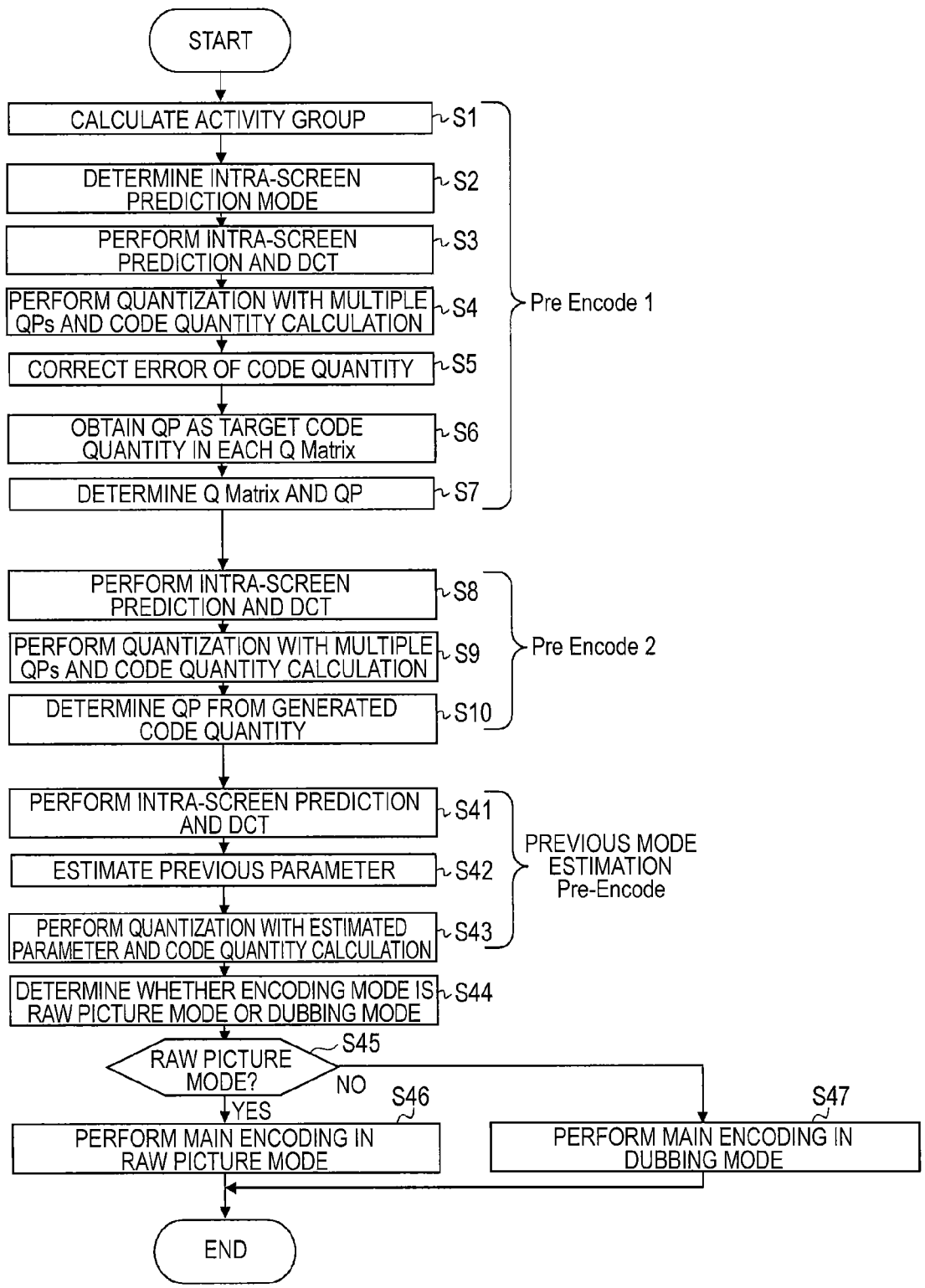
FIG. 6 is a flowchart showing an example of a processing procedure of coding by an image processing apparatus.

Returning to the flowchart of FIG. 6, subsequent to the processing of Step S7, generated code quantity acquisition processing by the second pre-encoding section 2 is performed (Steps S8 to S10). The object of the second pre-encoding section 2 is to increase estimation precision of the reference quantization parameter QPMB by performing pre-encoding again considering that there is an error in the estimation of the predictive quantization parameter QPd by the first pre-encoding section 1.

That is, pre-encoding is performed again with the quantization parameters QP around the predictive quantization parameter QPd roughly estimated by the result of the first pre-encoding section 1 to acquire the high-precision generated code quantity, and the quantization parameter QP closest to the target code quantity is obtained again. For entropy code length calculation, the same scheme (CABAC or CAVLC) as the main encoding is used.

Specifically, intra-screen prediction processing by the intra-screen prediction processing section 21 and DCT by the DCT section 22 are performed using the intra-screen prediction mode determined by the result of the first pre-encoding section 1 (Step S8). The second pre-encoding section 2 shares a local decode image (predicted image), which is quantized with the predictive quantization parameter QPd (QP_precode1) estimated by the result of the first pre-encoding section 1, as a local decode image for use in the intra-screen prediction.

During the quantization, the predictive quantization parameter QPd (QP_precode1), the quantization matrix Q Matrix, and the activity group determined by the result of the first pre-encoding section 1 are used. The predictive quantization parameter QPd (QP_precode1) is set in the quantization section 23-1, the quantization parameter QP (QP_precode1−1) which is smaller than the predictive quantization parameter QPd by "1" is set in the quantization section 23-2, and the quantization parameter (QP_precode1+1) which is greater than the predictive quantization parameter QPd by "1" is set in the quantization section 23-3.

In the quantization parameter (QP) of the MB, the value taking activity into consideration is given and encoded. With the above second pre-encoding, it is possible to acquire the high-precision generated code quantity of one picture (Step S9). Subsequently, the code quantity control section 4 determines the reference quantization parameter QPMB from the high-precision generated code quantity obtained on the basis of the second pre-encoding section 2 (Step S10).

Next, the image processing apparatus 100 performs previous mode estimation pre-encoding by the previous mode estimation pre-encoding section 40 (Step S41-S43). In the previous mode estimation pre-encoding, the previous mode estimation pre-encoding section 40 estimates the previous coding parameters (quantization parameter QP and intra-screen prediction mode) and acquires the back search generated code quantity when coding with the estimated coding parameters.

The image processing apparatus 100 generates differential image data between the predicted image and the input image 91 by the intra-screen prediction processing section 41. At this time, the intra-screen prediction processing section 41 calculates differential image data for each of a first candidate to an M-th candidate determined by the intra-screen prediction mode determination section 11. In the intra-screen prediction processing, intrinsically, the processing is performed using a local decode image. However, the processing is performed using the input image 91.

Next, the image processing apparatus 100 performs DCT by the DCT section 42, and supplies the output to the back search section 43 and the buffer 44 (Step S41). Subsequently, the previous mode estimation pre-encoding section 40 performs previous parameter estimation processing (Step S42).

Figure 8:
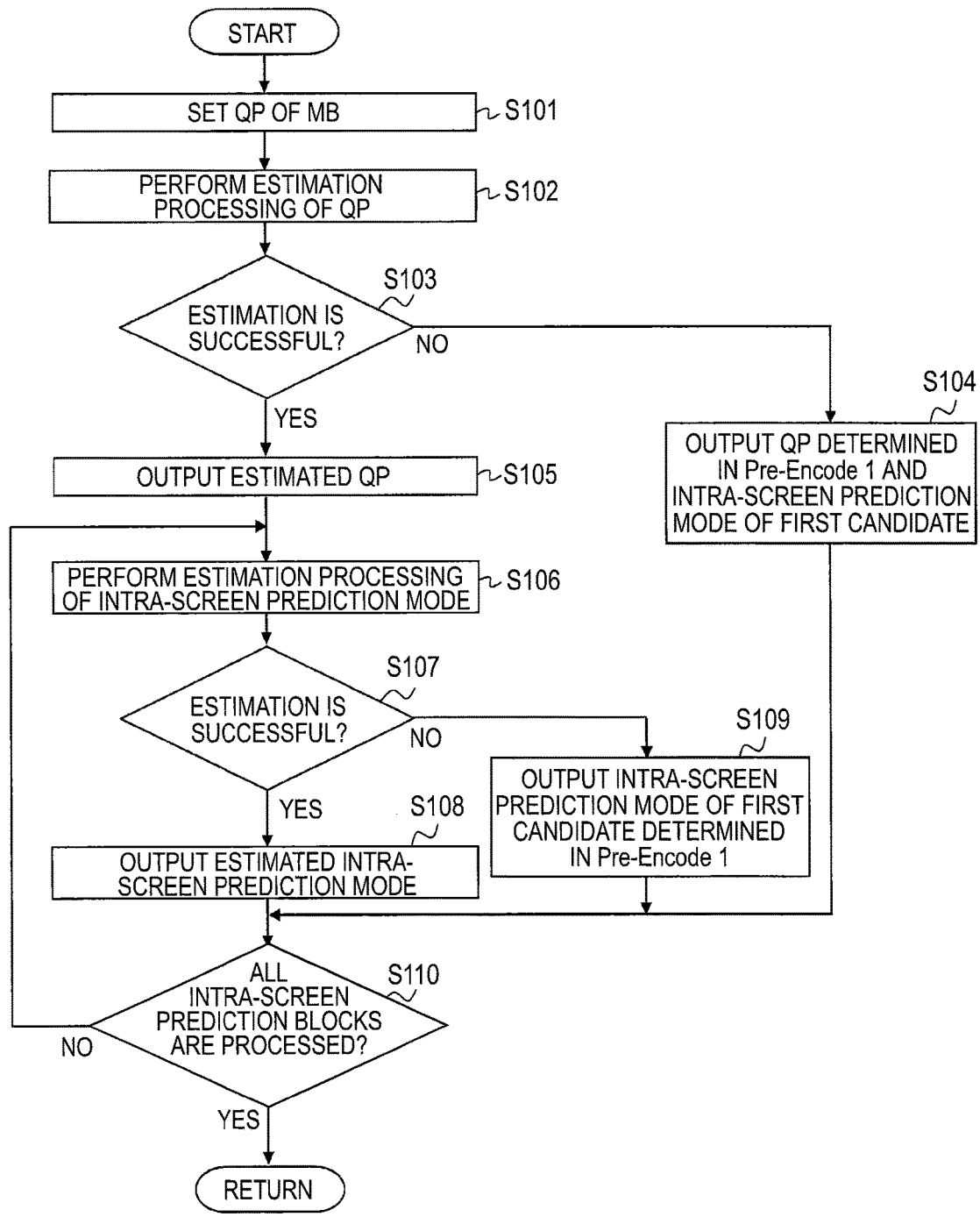
FIG. 8 is a flowchart illustrating processing for estimating a previous mode.

Previous mode estimation processing in Step S42 will be described referring to the flowchart of FIG. 8. First, an initial quantization parameter QP as a starting point of estimation is set from the predictive quantization parameter QPd and the activity group of each MB calculated by the first pre-encoding result (Step S101).

Subsequently, estimation processing of the detected quantization parameter QPe estimation processing is performed (Step S102). The estimation processing of the detected quantization parameter QPe is performed on a given range of quantization parameters QP with respect to the value set in Step S101. That is, the estimation processing is performed on the quantization parameters QP in a range of an upper limit value (QP UpperQPRange) to a lower limit value (QP LowerQPRange) from among the quantization parameters QP having 0 to 51. This range is set to, for example, about "10".

In other words, the previous mode estimation pre-encoding section 40 uses the predictive quantization matrix Q MatrixD obtained by the first pre-encoding section 1, and performs the estimation processing on a predetermined range of quantization parameters QP with the predictive quantization parameter QPd calculated on the basis of the result of the first pre-encoding section 1 as a starting point.

The back search section 43 determines whether or not the estimation of the detected quantization parameter QPe is successful (Step S103). When the estimation is not successful, the predictive quantization parameter QPd and the intra-screen prediction mode of the first candidate determined by the intra-screen prediction mode determination section 11 are output (Step S104). When the estimation is successful, the back search section 43 outputs the estimated detected quantization parameter QPe (Step S105) and performs the estimation processing of the intra-screen prediction mode (Step S106).

The estimation processing of the intra-screen prediction mode is performed for the first candidate to the M-th candidate. The back search section 43 determines whether the estimation of the intra-screen prediction mode is successful (Step S107). When the estimation is successful, the estimate intra-screen prediction mode is output (Step S108), and when the estimation is not successful, the intra-screen prediction mode of the first candidate determined by the intra-screen prediction mode determination section 11 is output (Step S109).

The back search section 43 determines whether or not the number of blocks which perform intra-screen prediction is processed (Step S110). If the processing is not completed, the procedure returns to Step S106, and the above-described processing is repeated. When it is determined that the processing is completed, the back search section 43 ends the previous mode estimation processing.

Returning to the flowchart of FIG. 6, subsequent to the processing of Step S42, the image processing apparatus 100 performs quantization by the quantization section 45, and performs code quantity calculation processing by the entropy code length calculation section 46 (Step S43).

That is, the quantization section 45 selects data relevant to the designated intra-screen prediction mode from data stored in the buffer 44 in accordance with the intra-screen prediction mode output from the back search section 43, and performs quantization. At this time, the quantization section performs quantization on the basis of the detected quantization parameter QPe output from the back search section 43.

Thereafter, the image processing apparatus 100 calculates the generated code quantity for each MB by the entropy code length calculation section 46. The entropy code length calculation is performed with the same scheme (CABAC/CAVLC) as entropy coding of the main encoding. The code quantity control section 4 estimates the back search generated code quantity of the picture when using the dubbing mode in accordance with the presence/absence of success of back search.

Figure 9:
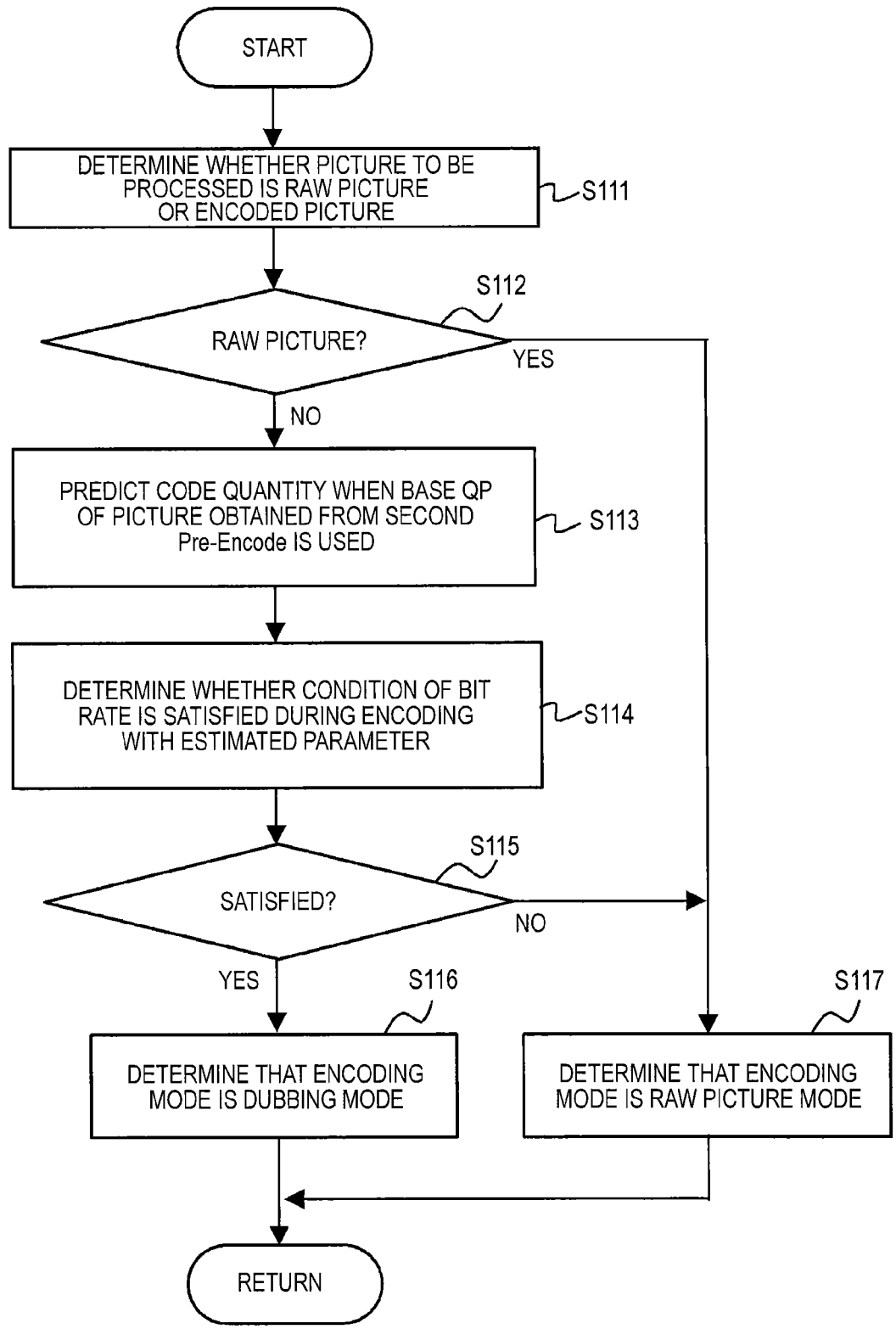
FIG. 9 is a flowchart illustrating processing for determining a raw picture mode/a dubbing mode.

Next, the image processing apparatus 100 determines the encoding mode (raw picture mode/dubbing mode) (Step S44). The raw picture mode/dubbing mode determination processing in Step S44 will be described referring to the flowchart of FIG. 9.

If this processing is entered, first, the code quantity control section 4 performs raw picture/non-raw picture (coded picture) determination (Step S111). That is, the code quantity control section 4 obtains the detection rate from the number of MBs detected by the detected quantization parameter QPe through the determination processing of the quantization parameter QP used in the previous coding and the total number of MBs, and determines to be a non-raw picture when the detection rate is equal to or greater than a given value.

When it is determined that a picture to be processed is a raw picture (Step S112 branches off to Yes), the code quantity control section 4 determines to be the raw picture mode (Step S117), and ends the determination processing. When it is determined that a picture to be processed is a non-raw picture (Step S112 branches off to No), the code quantity control section 4 predicts the back search generated code quantity when the picture to be processed is coded in the dubbing mode (Step S113).

For the not-success MB, the code quantity control section 4 predicts the code quantity when the reference quantization parameter QPMB obtained by the result of the second pre-encoding section 2 is used. It is determined whether or not the condition of the bit rate is satisfied when encoding is performed with the estimated parameter (Step S114).

When the condition of the bit rate (generated code quantity) is satisfied (Step S115 branches off to Yes), the code quantity control section 4 determines that the encoding mode in the main encoding section 3 is the dubbing mode (Step S116), and ends the determination processing. When the condition of the bit rate is not satisfied, the code quantity control section 4 determines that the encoding mode in the main encoding section 3 is the raw picture mode (Step S117), and ends the determination processing.

Returning to the flowchart of FIG. 6, subsequent to the processing of Step S44, when it is determined that the encoding mode is the raw picture mode (Step S45 branches off to YES), the image processing apparatus 100 performs the main encoding of the raw picture mode in the main encoding section 3 (Step S46). In the main encoding of the raw picture mode, encoding is performed using the average quantization parameter BaseQP subjected to the feedback control.

When it is determined that the encoding mode is a non-raw picture mode, that is, the dubbing mode (Step S45 branches off to NO), the image processing apparatus 100 performs the main encoding of the dubbing mode in the main encoding section 3 (Step S47). In the main encoding of the dubbing mode, when back search is not successful in the MB to be processed, the average quantization parameter BaseQP subjected to the feedback control is used.

In the main encoding of the dubbing mode, when back search is successful in the MB to be processed, the average quantization parameter BaseQP subjected to the feedback control or the detected quantization parameter QPe detected by the back search section 43 is selectively used in accordance with the determination result of a need for code quantity suppression.

That is, if it is determined that there is no need for code quantity suppression, the code quantity control section 4 performs control such that the quantization section 33 uses the detected quantization parameter QPe. If it is determined that there is a need for code quantity suppression, the code quantity control section 4 performs control such that the quantization section 33 uses the detected quantization parameter QPe when the detected quantization parameter QPe is not smaller than the average quantization parameter BaseQP. If it is determined that there is a need for code quantity suppression, the code quantity control section 4 performs control such that the quantization section 33 uses the average quantization parameter BaseQP subjected to the feedback control when the detected quantization parameter QPe is smaller than the average quantization parameter BaseQP.

Figure 10:
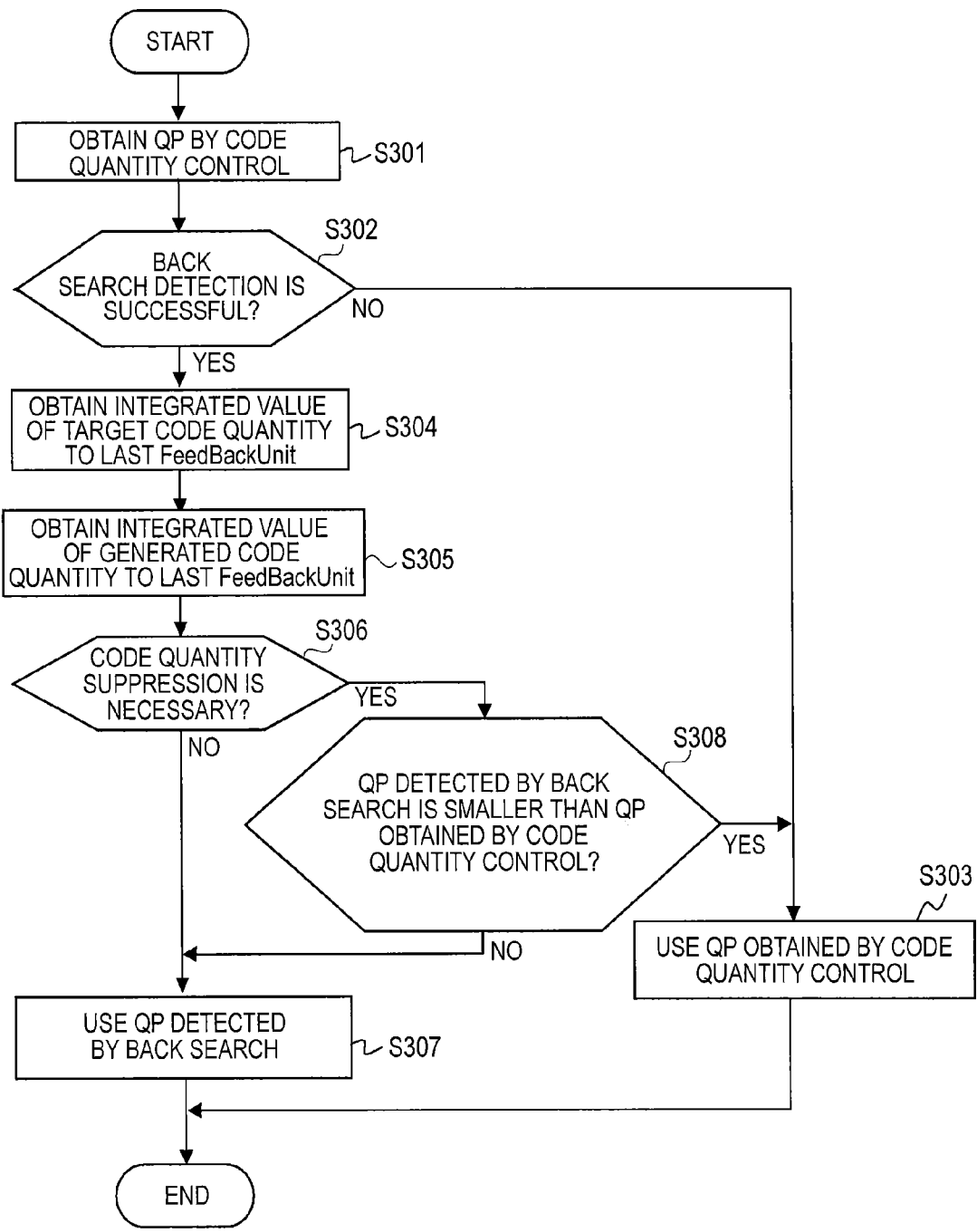
FIG. 10 is a diagram illustrating processing for determining a quantization parameter QP when main encoding is performed in a dubbing mode.

A procedure of determination processing of the quantization parameter QP when performing the main encoding in the dubbing mode will be described referring to flowchart of FIG. 10. First, the code quantity control section 4 obtains the average quantization parameter BaseQP subjected to the feedback control (Step S301). The average quantization parameter BaseQP is obtained when the above-described feedback control is executed (see the flowcharts of FIGS. 4 and 5).

When the back search detection is not successful (Step S302 branches off to NO), the code quantity control section 4 determines the use of the average quantization parameter BaseQP subjected to the feedback control obtained in Step S301 (Step S303), and ends the processing. When the back search detection is successful (Step S302 branches off to YES), the code quantity control section 4 progresses to the processing of Step S304.

The code quantity control section 4 obtains the integrated value of the target code quantity to the last feedback control unit (Step S304), and obtains the integrated value of the generated code quantity to the last feedback control unit (Step S305). The code quantity control section 4 compares the integrated values to determine whether or not there is a need for code quantity suppression (Step S306).

That is, when the integrated value of the target code quantity is greater than the integrated value of the generated code quantity, the code quantity control section 4 determined to be a normal mode, and otherwise, determines to be a code quantity suppression mode. Expression (27) represents a normal mode determination condition.

"integrated value of previous target code quantity">"integrated value of previous generated code quantity"+margin  (27)

When it is determined that there is no need for code quantity suppression, the code quantity control section 4 determines the use of the detected quantization parameter QPe obtained by the back search detection (Step S307), and ends the processing. When it is determined that there is a need for code quantity suppression, the code quantity control section 4 progresses to the processing of Step S308. The code quantity control section 4 determines whether or not the detected quantization parameter QPe obtained by the back search detection is smaller than the average quantization parameter BaseQP subjected to the feedback control obtained in Step S301.

When the detected quantization parameter QPe is not smaller than the average quantization parameter BaseQP, the code quantity control section 4 determines the use of the detected quantization parameter QPe obtained by the back search detection (Step S307), and ends the processing. When the detected quantization parameter QPe is smaller than the average quantization parameter BaseQP, the code quantity control section 4 determines the use of the average quantization parameter BaseQP subjected to the feedback control (Step S303), and ends the processing.

Figure 11:
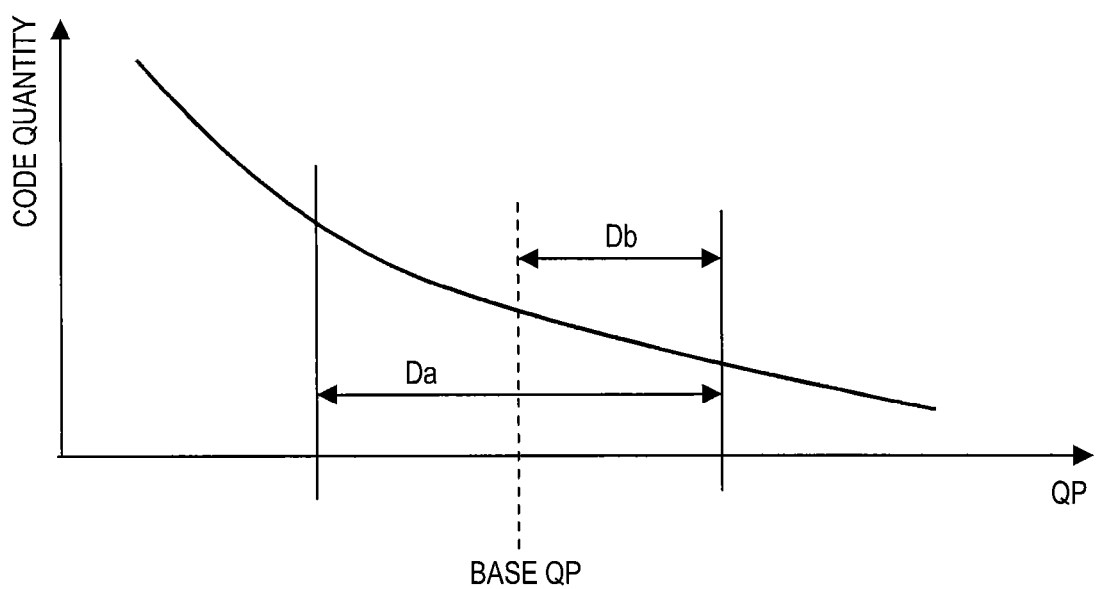
FIG. 11 is a diagram showing an introduction range of a detected quantization parameter QPe detected by back search detection in a dubbing mode.

FIG. 11 shows an introduction range of the detected quantization parameter QPe obtained by the back search detection in the dubbing mode. A range Da represents an introduction range in the normal mode, and a range Db represents an introduction range in the code quantity suppression mode. In the code quantity suppression mode, the detected quantization parameter QPe is introduced only when the detected quantization parameter QPe is greater than the average quantization parameter BaseQP.

As described above, in the image processing apparatus 100 shown in FIGS. 1 and 2, in the dubbing mode, the introduction of the detected quantization parameter QPe obtained by the back search detection is determined in an MB unit (coding unit). Accordingly, it is possible to avoid the occurrence of flickering during the determination in a picture unit.

In the image processing apparatus 100 shown in FIGS. 1 and 2, when there is a need for code quantity suppression, the detected quantization parameter QPe obtained by the back search detection is used in a usable range. For this reason, it is possible to decrease the addition of unwanted distortion compared to a case where the average quantization parameter BaseQP subjected to the feedback control is simply used, and to reduce image quality deterioration, thereby achieving high image quality.

[Description of Computer to which Present Technology is Applied]

A sequence of processing described above may be performed by hardware or software. When a sequence of processing is performed by software, a program which constitutes software is installed on a general-purpose computer or the like.

Figure 12:
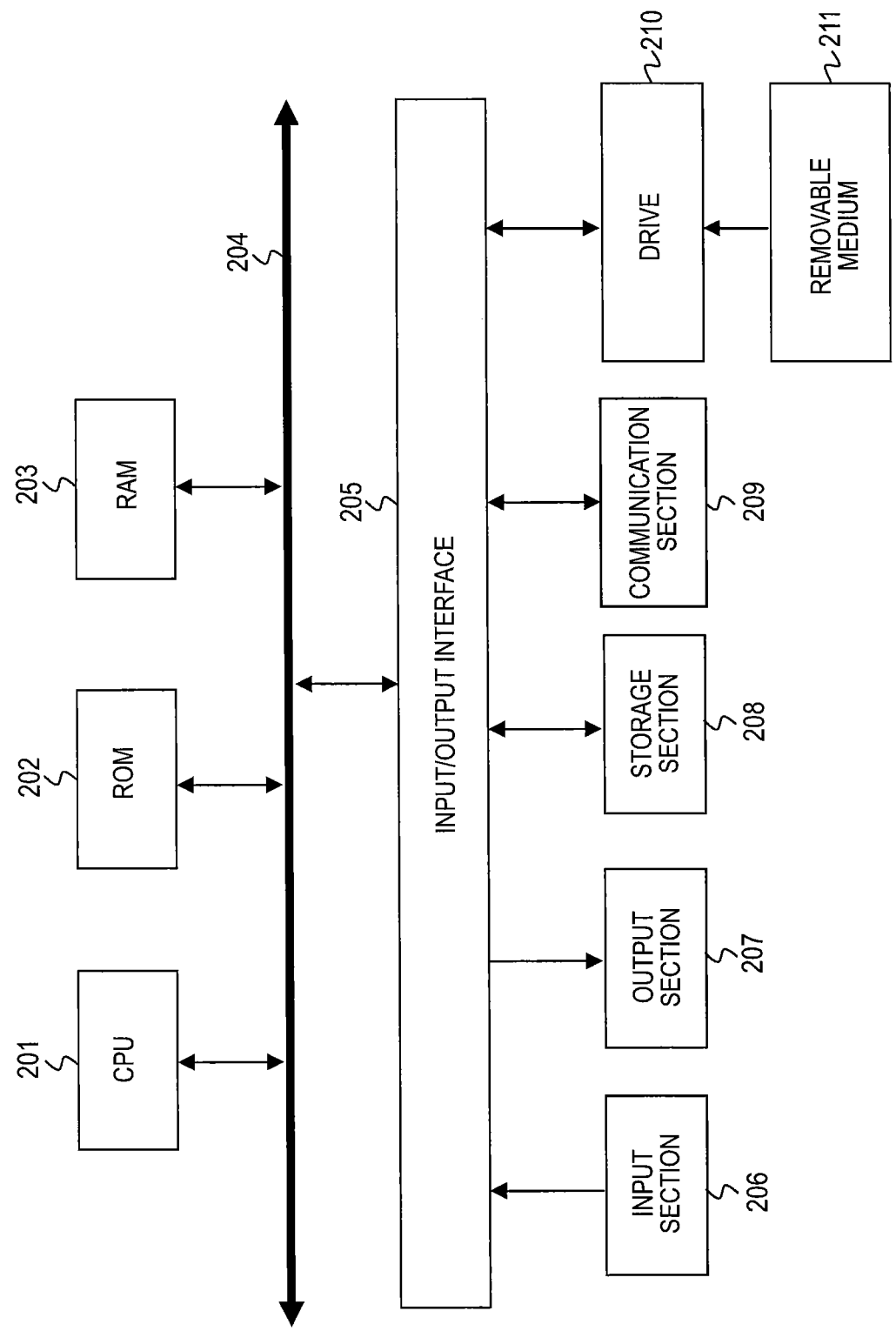
FIG. 12 is a block diagram showing a configuration example of a computer on which a program for executing image processing is installed.

FIG. 12 shows a configuration example of a computer on which a program for executing a sequence of processing described above is installed. The program may be stored in advance in a storage section 208 or a ROM (Read Only Memory) 202 which serves as an internal recording medium of the computer.

The program may be stored (recorded) in a removable medium 211. The removable medium 211 may be provided as a so-called package software. As the removable medium 211, for example, there are a flexible disk, a compact disc read only memory (CD-ROM), a magneto optical (MO) disc, a digital versatile disc (DVD), a magnetic disk, a semiconductor memory, and the like.

The program may be installed on the computer from the removable medium 211 through a drive 210, or may be downloaded to the computer through a communication network or a broadcasting network, or may be installed on the internal storage section 208. That is, the program may be transferred, for example, from a download site to the computer through a digital satellite broadcasting satellite in a wireless manner, or may be transferred to the computer through a network, such as a local area network (LAN) or Internet, in a wired manner.

The computer is embedded with an internal CPU (Central Processing section) 201, and an output/input interface 205 is connected to the CPU 201 through a bus 204. If a user operates an input section 206 through the input/output interface 205 and a command is input, the CPU 201 executes the program stored in the ROM 202 in response to the command. Alternatively, the CPU 201 loads and executes the program stored in the storage section 208 on a random access memory (RAM) 203.

Accordingly, the CPU 201 performs the processing according to the above-described flowcharts or the processing which is performed by the configuration of the block diagram. The CPU 201 outputs the processing result from an output section 207 through the input/output interface 205, transmit the processing result from a communication section 209, stores the processing result in the storage section 208, or the like as necessary. The input section 206 has a keyboard, a mouse, a microphone, and the like. The output section 207 has a liquid crystal display (LCD), a speaker, and the like.

In this specification, the processing which is performed by the computer in accordance with the program is not necessary performed in time series in accordance with the sequence described as the flowcharts. That is, the processing which is performed by the computer in accordance with the program includes processing (for example, parallel processing or object-based processing) which is executed in parallel or individually. The program may be processed by a single computer (processor) or may be processed by a plurality of computers in a distributed manner. The program may be transferred to a distant computer and executed.

2. Modification

In the foregoing embodiment, a case where the image processing apparatus 100 has a three-pass configuration in which the predictive quantization parameter QPd is determined on the basis of the result of the first pre-encoding section 1, and the reference quantization parameter QPMB is determined on the basis of the result of the second pre-encoding section 2 has been described. The present technology is not limited thereto, and for example, may be applied to an image processing apparatus having a two-pass configuration, in which the first encoding section 1 determines the reference quantization parameter QPMB, or a four or more-pass configuration.

In the foregoing embodiment, a case where the input image 91 is coded by coding using intra-screen prediction, quadrature conversion by DCT, quantization, and coding by CAVLC or CABAC has been described. The present technology is not limited thereto, and any of them may be omitted. It should suffice that at least the input image 91 is quantized. The input image 91 may be coded using other coding methods.

In the foregoing embodiment, a case where the feedback generated code quantity is confirmed for each feedback control having a plurality of MBs has been described. The present technology is not limited thereto. The size of the feedback control unit is not limited, and for example, the feedback control unit may be set in terms of MBs or slices.

In the foregoing embodiment, a case where the generated code quantity for each picture as an image unit is suppressed to be equal to or smaller than the target code quantity has been described. The present technology is not limited thereto, and for example, the generated code quantity for each slice or for every multiple pictures as an image unit may be suppressed to be equal to or smaller than the target code quantity.

In the foregoing embodiment, a case where the average quantization parameter BaseQP increases by "1" in association with the feedback control for the feedback control unit has been described. The present technology is not limited thereto, and the average quantization parameter BaseQP may increase by "2" or more in accordance with the conditions.

In the foregoing embodiment, a case where it is determined that the generated code quantity for each feedback control unit tends to increase when the last feedback generated code quantity exceeds the feedback target code quantity has been described. The present technology is not limited thereto, and for example, it may be determined that the generated code quantity for each feedback control unit tends to increase depending on whether or not the generated code quantity for every multiple previous feedback control units exceeds the target code quantity.

Embodiments of the present technology are not limited to the foregoing embodiments, and may be modified in various forms within the scope without departing from the gist of the present technology.

The present technology may have the following configuration.

(1) An image processing apparatus including
a quantization parameter determination section which determines a reference quantization parameter to be predicted if a generated code quantity for each image unit when coding an input image becomes close to a target code quantity for each image unit,
a back search section which detects, as a detected quantization parameter for each coding unit, a quantization parameter used when the input image is coded previously,
a coding section which codes the input image for each coding unit,
a feedback control section which confirms the generated code quantity of the input image coded by the coding section for each feedback control unit, and if it is predicted that the generated code quantity for each image unit exceeds the target code quantity for each image unit, increases the determined reference quantization parameter, and
a coding control section which performs control such that, during dubbing, the coding section uses the reference quantization parameter subjected to the feedback control for each coding unit when the back search detection is not successful and selectively uses the reference quantization parameter subjected to the feedback control or the detected quantization parameter obtained by the back search detection for each coding unit in accordance with a determination result of a need for code quantity suppression when the back search detection is successful (2) The image processing apparatus described in (1),
wherein, when the back search detection is successful, the coding control section performs control such that, if it is determined that there is no need for the code quantity suppression, the coding section uses the detected quantization parameter, and
if it is determined that there is a need for the code quantity suppression, the coding section uses the detected quantization parameter when the detected quantization parameter is not smaller than the reference quantization parameter subjected to the feedback control and uses the reference quantization parameter subjected to the feedback control when the detected quantization parameter is smaller than the reference quantization parameter subjected to the feedback control.

(3) The image processing apparatus described in (1) or (2),
wherein, when an integrated value of the generated code quantity to a last feedback control unit is greater than an integrated value of the target code quantity to a last feedback control unit, the coding control section determines that there is a need for the code quantity suppression.

(4) An image processing method including
determining a reference quantization parameter to be predicted if a generated code quantity for each image unit when coding an input image becomes close to a target code quantity for each image unit,
detecting, as a detected quantization parameter for each coding unit, a quantization parameter used when the input image is coded previously,
coding the input image for each coding unit,
confirming the generated code quantity of the input image coded in the coding of the input image for each feedback control unit, and if it is predicted that the generated code quantity for each image unit exceeds the target code quantity for each image unit, increasing the determined reference quantization parameter, and
performing control such that, during dubbing, coding in the coding of the input image uses the reference quantization parameter subjected to the feedback control for each coding unit when the back search detection is not successful and selectively uses the reference quantization parameter subjected to the feedback control or the detected quantization parameter obtained by the back search detection for each coding unit in accordance with a determination result of a need for code quantity suppression when the back search detection is successful.

(5) A program which cause a computer to function as
reference quantization parameter determination means for determining a reference quantization parameter to be predicted if a generated code quantity for each image unit when coding an input image becomes close to a target code quantity for each image unit,
back search means for detecting, as a detected quantization parameter for each coding unit, a quantization parameter used when the input image is coded previously,
coding means for coding the input image for each coding unit,
feedback control means for confirming the generated code quantity of the input image coded by the coding means for each feedback control unit, and if it is predicted that the generated code quantity for each image unit exceeds the target code quantity for each image unit, increasing the determined reference quantization parameter, and
coding control means for performing control such that, during dubbing, the coding means uses the reference quantization parameter subjected to the feedback control for each coding unit when the back search detection is not successful and selectively uses the reference quantization parameter subjected to the feedback control or the detected quantization parameter obtained by the back search detection for each coding unit in accordance with a determination result of a need for code quantity suppression when the back search detection is successful.

The present disclosure contains subject matter related to that disclosed in Japanese Priority Patent Application JP 2012-123593 filed in the Japan Patent Office on May 30, 2012, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus, comprising:
one or more processors configured to:
determine, in an event an input image is coded, a reference quantization parameter predicted among a plurality of quantization parameters, wherein the reference quantization parameter has a generated code quantity closer to a target code quantity than generated code quantities for other of the plurality of quantization parameters;

detect, based on back search detection, as a detected quantization parameter, a quantization parameter used in an event the input image is coded previously;

code the input image based on the reference quantization parameter;

confirm the generated code quantity of the coded input image and, in an event it is predicted that the generated code quantity exceeds the target code quantity, increase the determined reference quantization parameter;

control coding such that, in dubbing mode, in an event the back search detection is unsuccessful, the input image is coded by use of the increased reference quantization parameter, and in an event the back search detection is successful, the input image is coded by selective use of the increased reference quantization parameter or the detected quantization parameter obtained by the back search detection, wherein the coding is controlled based on a comparison result of a comparison between an integrated value of the generated code quantity and an integrated value of the target code quantity; and generate a back search generated code quantity based on a sum of the generated code quantity of a plurality of macro blocks in which the back search detection is successful, and also based on a sum of the generated code quantity of the plurality of macro blocks in which the back search detection is unsuccessful, wherein the sum of the generated code quantity of the plurality of macro blocks in which the back search detection is unsuccessful is calculated based on the reference quantization parameter.

2. The image processing apparatus according to claim 1, wherein the one or more processors are further configured to:

use the detected quantization parameter in an event the back search detection is successful, and in an event that the integrated value of the generated code quantity is less than the integrated value of the target code quantity; and use the reference quantization parameter in an event that the integrated value of the generated code quantity is greater than the integrated value of the target code quantity and in an event the detected quantization parameter is greater than the increased reference quantization parameter; and use the increased reference quantization parameter, in an event the detected quantization parameter is smaller than the increased reference quantization parameter.

3. The image processing apparatus according to claim 1, wherein the one or more processors are further configured to determine whether the input image is a non-raw picture based on whether a success rate of back search is equal to or greater than a threshold value.

4. The image processing apparatus according to claim 1, wherein the one or more processors are further configured to generate code quantity in an event the back search detection is unsuccessful based on the sum of the generated code quantity of the plurality of macro blocks in which the back search detection is unsuccessful, and a difference value between a predictive quantization parameter and the reference quantization parameter.

5. An image processing method, comprising:

in an image processing apparatus that comprises one or more processors:

determining, in an event of coding an input image, a reference quantization parameter predicted among a plurality of quantization parameters, wherein the reference quantization parameter has a generated code quantity closer to a target code quantity than generated code quantities for other of the plurality of quantization parameters;

detecting, based on back search detection, as a detected quantization parameter, a quantization parameter used in an event the input image is coded previously;

coding the input image based on the reference quantization parameter;

confirming the generated code quantity of the coded input image, and in an event it is predicted that the generated code quantity exceeds the target code quantity, increasing the determined reference quantization parameter;

controlling coding such that, during dubbing, in an event the back search detection is unsuccessful, the coding of the input image uses the increased reference quantization parameter, and in an event the back search detection is successful, the coding of the input image selectively uses the increased reference quantization parameter or the detected quantization parameter obtained by the back search detection, wherein the coding is controlled based on a comparison result of a comparison between an integrated value of the generated code quantity and an integrated value of the target code quantity; and generating a back search generated code quantity based on a sum of the generated code quantity of a plurality of macro blocks in which the back search detection is successful, and also based on a sum of the generated code quantity of the plurality of macro blocks in which the back search detection is unsuccessful, wherein the sum of the generated code quantity of the plurality of macro blocks in which the back search detection is unsuccessful is calculated based on the reference quantization parameter.

6. A non-transitory computer-readable storage medium having stored thereon computer-executable instructions for causing a computer to execute operations, comprising:

determining, in an event of coding an input image, a reference quantization parameter predicted among a plurality of quantization parameters, wherein the reference quantization parameter has a generated code quantity closer to a target code quantity than generated code quantities for other of the plurality of quantization parameters;

detecting based on back search detection, as a detected quantization parameter, a quantization parameter used in an event the input image is coded previously;

coding the input image based on the reference quantization parameter;

confirming the generated code quantity of the coded input image and, in an event it is predicted that the generated code quantity exceeds the target code quantity, increasing the determined reference quantization parameter;

controlling coding such that, during dubbing, in an event the back search detection is unsuccessful, the increased reference quantization parameter is used to code the input image, and in an event the back search detection is successful, the increased reference quantization parameter or the detected quantization parameter obtained by the back search detection is selectively used to code the input image, wherein the coding is controlled based on a comparison result of a comparison between an integrated value of the generated code quantity and an integrated value of the target code quantity; and generating a back search generated code quantity based on a sum of the generated code quantity of a plurality of macro blocks in which the back search detection is successful, and also based on a sum of the generated code quantity of the plurality of macro blocks in which the back search detection is unsuccessful, wherein the sum of the generated code quantity of the plurality of macro blocks in which the back search detection is unsuccessful is calculated based on the reference quantization parameter.

* * * * *